United States Patent
Kohno et al.

(10) Patent No.: US 11,267,456 B2
(45) Date of Patent: Mar. 8, 2022

(54) HYBRID VEHICLE

(71) Applicant: TOYOTA JIDOSHA KABUSHIKI KAISHA, Toyota (JP)

(72) Inventors: Takashi Kohno, Toyota (JP); Shinichi Sasade, Toyota (JP); Takahiro Kimura, Toyota (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/991,469

(22) Filed: Aug. 12, 2020

(65) Prior Publication Data
US 2021/0061259 A1 Mar. 4, 2021

(30) Foreign Application Priority Data
Aug. 29, 2019 (JP) .............................. JP2019-157046

(51) Int. Cl.
| | |
|---|---|
| *B60W 20/30* | (2016.01) |
| *B60W 10/06* | (2006.01) |
| *B60W 10/08* | (2006.01) |
| *B60W 10/115* | (2012.01) |
| *B60W 10/26* | (2006.01) |
| *B60W 30/188* | (2012.01) |
| *B60W 20/10* | (2016.01) |

(52) U.S. Cl.
CPC ............ *B60W 20/30* (2013.01); *B60W 10/06* (2013.01); *B60W 10/08* (2013.01); *B60W 10/115* (2013.01); *B60W 10/26* (2013.01); *B60W 20/10* (2013.01); *B60W 30/188* (2013.01); *B60W 2510/1005* (2013.01); *B60W 2510/244* (2013.01); *B60W 2520/10* (2013.01); *B60W 2540/10* (2013.01); *B60W 2710/0644* (2013.01); *B60W 2710/0677* (2013.01)

(58) Field of Classification Search
CPC ...... B60W 20/30; B60W 20/10; B60W 10/06; B60W 10/08; B60W 10/115; B60W 10/26; B60W 30/188; B60W 2510/1005; B60W 2510/244; B60W 2520/10; B60W 2540/10; B60W 2710/0644; B60W 2710/0677; B60K 2006/381
See application file for complete search history.

(56) References Cited

U.S. PATENT DOCUMENTS

| | | | | |
|---|---|---|---|---|
| 2013/0296100 | A1* | 11/2013 | Nefcy ................... | B60W 20/14 477/4 |
| 2014/0309828 | A1* | 10/2014 | Yamazaki ............... | B60L 3/108 701/22 |

(Continued)

FOREIGN PATENT DOCUMENTS

JP 2017-159732 A 9/2017

Primary Examiner — George C Jin
(74) Attorney, Agent, or Firm — Oliff PLC

(57) ABSTRACT

When the required driving force is larger than the first upper limit driving force, the control device sets a target compensation power of a power storage device, based on a difference between the required driving force and the first upper limit driving force. Further, the control device gradually increases a working compensation power toward the target compensation power when the gear ratio of the stepped transmission is changed, compared with an increase in the working compensation power when the gear ratio of the stepped transmission is not changed.

6 Claims, 17 Drawing Sheets

(56) References Cited

U.S. PATENT DOCUMENTS

2017/0197610 A1\* 7/2017 Sato .................. B60K 6/445
2017/0259802 A1 9/2017 Kato et al.
2017/0297559 A1\* 10/2017 Minamikawa ......... B60K 6/543
2021/0061259 A1\* 3/2021 Kohno ................. B60K 6/365

\* cited by examiner

|  | C1 | C2 | B1 | B2 | B3 |
|---|---|---|---|---|---|
| 1st | O | – | – | – | O |
| 2nd | O | – | – | O | – |
| 3rd | O | – | O | – | – |
| 4th | O | O | – | – | – |
| R | – | O | – | – | O |
| N | – | – | – | – | – |

"O": ENGAGE, "–": DISENGAGE

FIG. 3

HYBRID VEHICLE

CROSS-REFERENCE TO RELATED APPLICATIONS

The present disclosure claims priority to Japanese Patent Application No. 2019-157046 filed Aug. 29, 2019, which is incorporated herein by reference in its entirety including specification, drawings and claims.

TECHNICAL FIELD

The present disclosure relates to a hybrid vehicle.

BACKGROUND

In a proposed configuration of a hybrid vehicle, a planetary gear has a sun gear connected with a first motor, a carrier connected with an engine, a ring gear connected with a transmission member, the transmission member connected with a second motor, a stepped transmission placed between the transmission member and a driveshaft linked with an axle, and a battery connected with the first motor and with the second motor via power lines (as described in, for example, JP 2017-159732A). This hybrid vehicle sets a required driving force that is required for the driveshaft, based on an accelerator position and a vehicle speed. This hybrid vehicle also sets a gear ratio to the gear ratio of the stepped transmission by taking into account a virtual gear ratio based on the accelerator position and the vehicle speed. This hybrid vehicle sets a drivability rotation speed of the engine, based on the vehicle speed and the gear ratio. This hybrid vehicle sets an upper limit power of the engine when the engine is operated at the drivability rotation speed. This hybrid vehicle sets an upper limit driving force of the driveshaft when the upper limit power is output from the engine. This hybrid vehicle controls the engine, the first motor, the second motor, and the stepped transmission such that the engine is operated at the drivability rotation speed and the smaller between the required driving force and the upper limit driving force is output to the driveshaft. In this hybrid vehicle, such control causes the rotation speed of the engine to be a rotation speed according to the vehicle speed even when the driver steps on an accelerator pedal. This hybrid vehicle gives the driver the better drive feeling, compared with a configuration abruptly increases the rotation speed of the engine prior to an increase in the vehicle speed. In this hybrid vehicle, the rotation speed of the engine varies with a change in the gear ratio. This hybrid vehicle accordingly gives the driver the feeling of speed change.

SUMMARY

In the hybrid vehicle described above, it is possible to increase a torque output from the second motor to the drive shaft by using electric power of the battery in order to output larger driving force than the upper limit driving force to the drive shaft when the required driving force becomes larger than the upper limit driving force. When this control overlaps with the change of the gear ratio of the stepped transmission, a variation of the driving force output to the drive shaft becomes larger depending on how such control is performed. This may cause a gear shift shock.

A main object of a hybrid vehicle of the present disclosure is to suppress a gear shift shock.

In order to achieve the above main object, the hybrid vehicle of the present disclosure employs the following configuration.

The present disclosure is directed to a hybrid vehicle. The hybrid vehicle includes an engine, a first motor, a planetary gear including three rotational elements that are respectively connected with the engine, the first motor and a transmission member, a stepped transmission placed between the transmission member and a driveshaft linked with an axle, a second motor configured to input and output power from and to the transmission member or the driveshaft, a power storage device configured to transmit electric power to and from the first motor and the second motor, and a control device. The control device is programmed to set a required driving force that is required for the driveshaft, based on an operation amount of an accelerator and a vehicle speed, set a simulated gear ratio from a gear ratio of the stepped transmission or from the gear ratio of the stepped transmission by taking into account a virtual gear ratio and set a target gear ratio of the stepped transmission, based on the operation amount of the accelerator and the vehicle speed or based on a driver's shift operation, set a target rotation speed of the engine, based on the vehicle speed and the simulated gear ratio, set an upper limit power of the engine when the engine is operated at the target rotation speed, set a first upper limit driving force of the driveshaft when the upper limit power is output from the engine, set a target driving force of the driveshaft according to a magnitude relationship between the required driving force and the first upper limit driving force, and control the engine, the first motor, the second motor and the stepped transmission, such that the engine is operated at the target rotation speed, the gear ratio of the stepped transmission becomes equal to the target gear ratio, and the hybrid vehicle is driven based on the target driving force. When the required driving force is equal to or smaller than the first upper limit driving force, the control device is programmed to set the target driving force to the required driving force, and when the required driving force is larger than the first upper limit driving force, the control device is programmed to set a target compensation power of the power storage device, based on a difference between the required driving force and the first upper limit driving force. The control device is programmed to set a second upper limit driving force of the driveshaft when the upper limit power is output from the engine and the power storage device is charged or discharged according to a working compensation power based on the target compensation power, and the control device sets the target driving force to the smaller between the required driving force and the second upper limit driving force. The control device is programmed to gradually increase the working compensation power toward the target compensation power when the gear ratio of the stepped transmission is changed, compared with an increase in the working compensation power when the gear ratio of the stepped transmission is not changed.

In the hybrid vehicle according to this aspect of the present disclosure, when the required driving force is equal to or smaller than the first upper limit driving force, the control device sets the target driving force to the required driving force. When the required driving force is larger than the first upper limit driving force, the control device sets the target compensation power of the power storage device, based on the difference between the required driving force and the first upper limit driving force. The control device sets the second upper limit driving force of the driveshaft when the upper limit power is output from the engine and the power storage device is charged or discharged with the power based on the target compensation power. The control device sets the target driving force to the smaller between the required driving force and the second upper limit driving force. Further, the control device gradually increases the working compensation power toward the target compensation power when the gear ratio of the stepped transmission is changed, compared with the increase in the working compensation power when the gear ratio of the stepped transmission is not changed. The hybrid vehicle of the present disclosure further suppresses the variation of the driving force output to the drive shaft with the change of the gear ratio of the stepped transmission, and suppresses the gear shift shock.

BRIEF DESCRIPTION OF DRAWINGS

FIG. 3 is an operation table showing a relationship between the respective speeds of the stepped transmission and the states of clutches C1 and C2 and brakes B1, B2 and B3;

DESCRIPTION OF EMBODIMENTS

The following describes some aspects of the disclosure with reference to embodiments.

Figure 1:
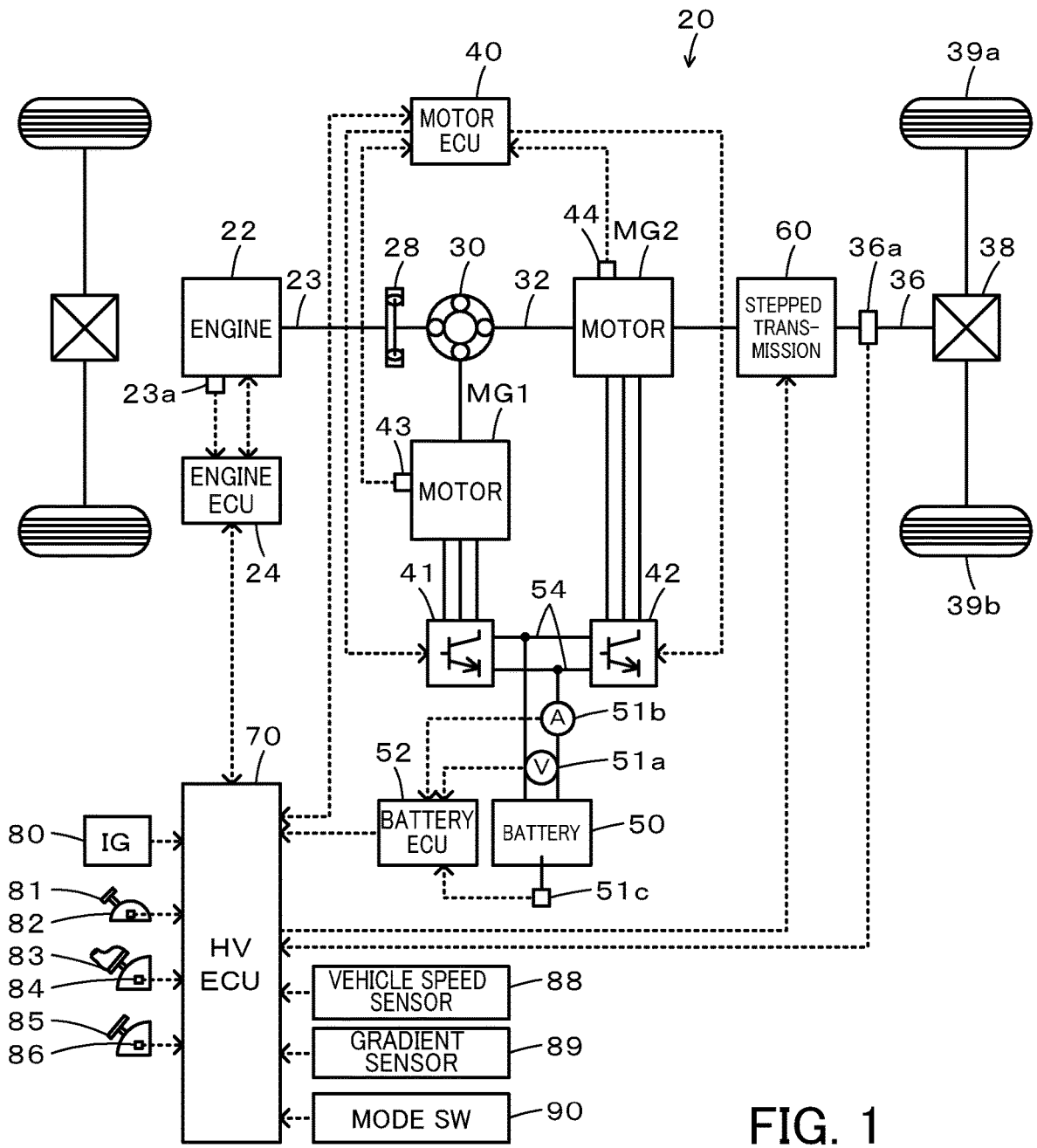
FIG. 1 is a configuration diagram illustrating the schematic configuration of a hybrid vehicle according to one embodiment of the present disclosure.
Figure 2:
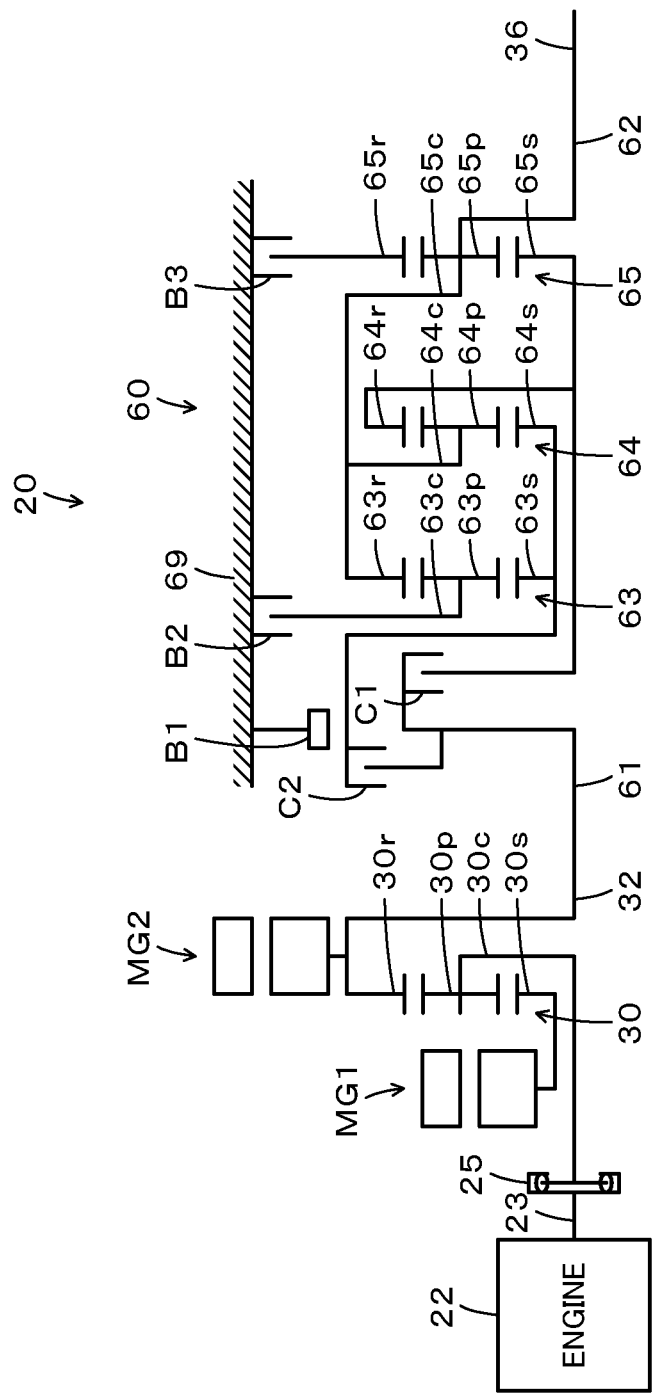
FIG. 2 is a configuration diagram illustrating the schematic configuration of an engine, a planetary gear, motors MG1 and MG2 and a stepped transmission.

FIG. 1 is a configuration diagram illustrating the schematic configuration of a hybrid vehicle 20 according to one embodiment of the present disclosure. FIG. 2 is a configuration diagram illustrating the schematic configuration of an engine 22, a planetary gear 30, motors MG1 and MG2 and a stepped transmission 60. As illustrated in FIGS. 1 and 2, the hybrid vehicle 20 of the embodiment includes an engine 22, a planetary gear 30, motors MG1 and MG2, inverters 41 and 42, a battery 50 serving as a power storage device, a stepped transmission 60, and a hybrid electronic control unit (hereinafter referred to as "HVECU") 70.

The engine 22 is configured as an internal combustion engine to output power by using, for example, gasoline or light oil as a fuel. This engine 22 is operated and controlled by an engine electronic control unit (hereinafter referred to as "engine ECU") 24.

The engine ECU 24 includes a microcomputer including a CPU, a ROM, a RAM, input/output ports, and a communication port. Signals from various sensors required for operating and controlling the engine 22 are input into the engine ECU 24 via the input port. The signals input into the engine ECU 24 include, for example, a crank angle θcr of a crankshaft 23 from a crank position sensor 23a configured to detect the rotational position of the crankshaft 23 of the engine 22. The engine ECU outputs various control signals for operating and controlling the engine 22 via the output port. The engine ECU 24 is connected with the HVECU 70 via respective communication ports. The engine ECU 24 calculates a rotation speed Ne of the engine 22, based on the crank angle θcr input from the crank position sensor 23a.

The planetary gear 30 is configured as a single pinion-type planetary gear mechanism. This planetary gear 30 includes a sun gear 30s as an external gear, a ring gear 30r as an internal gear, a plurality of pinion gears 30p respectively engaged with the sun gear 30s and the ring gear 30r, and a carrier 30c provided to support the plurality of pinion gears 30p to be rotatable on their axes and revolvable. The sun gear 30s is connected with a rotor of the motor MG1. The ring gear 30r is connected with a rotor of the motor MG2 and with an input shaft 61 of the stepped transmission 60 via a transmission member 32. The carrier 30c is connected with the crankshaft 23 of the engine 22 via a damper 28.

Both the motors MG1 and MG2 are configured, for example, as synchronous generator motors. The rotor of the motor MG1 is connected with the sun gear 30s of the planetary gear 30 as described above. The rotor of the motor MG2 is connected with the ring gear 30r of the planetary gear 30 and with the input shaft 61 of the stepped transmission 60 via the transmission member 32 as described above. The inverters 41 and 42 are used to drive the motors MG1 and MG2 and are connected with the battery 50 via power lines 54. A motor electronic control unit (hereinafter referred to as "motor ECU") 40 performs switching control of a plurality of switching elements (not shown) included in the inverters 41 and 42, so as to rotate and drive the motors MG1 and MG2.

The motor ECU 40 includes a microcomputer including a CPU, a ROM, a RAM, input/output ports, and a communication port. Signals from various sensors required for driving and controlling the motors MG1 and MG2 are input into the motor ECU 40 via the input port. The signals input into the motor ECU 40 include, for example, rotational positions θm1 and θm2 of the respective rotors of the motor MG1 and MG2 from rotational position sensors 43 and 44 configured to detect the rotational positions of the respective rotors of the motors MG1 and MG2 and phase currents Iu1, Iv1, Iu2 and Iv2 of respective phases of the motors MG1 and MG2 from current sensors configured to detect the phase currents flowing in the respective phases of the motors MG1 and MG2. The motor ECU 40 outputs, for example, switching control signals to the plurality of switching elements (not shown) included in the inverters 41 and 42 via the output port. The motor ECU 40 is connected with the HVECU 70 via the respective communication ports. The motor ECU 40 calculates electrical angles θe1 and θe2 and rotation speeds Nm1 and Nm2 of the motors MG1 and MG2, based on the rotational positions θm1 and θm2 of the respective rotors of the motor MG1 and MG2 input from the rotational position sensors 43 and 44.

The battery 50 is configured as, for example, a lithium ion rechargeable battery or a nickel metal hydride battery. This battery 50 is connected with the inverters 41 and 42 via the power lines 54 as described above. The battery 50 is under management of a battery electronic control unit (hereinafter referred to as "battery ECU") 52.

The battery ECU 52 includes a microcomputer including a CPU, a ROM, a RAM, input/output ports, and a communication port. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC of the battery 50, based on an integrated value of the electric current Ib of the battery 50 input from the current sensor 51b. The state of charge SOC denotes a ratio of the capacity of electric power dischargeable from the battery 50 to the total capacity of the battery 50. The battery ECU 52 also calculates an input limit Win and an output limit Wout of the battery 50, based on the state of charge SOC of the battery 50 and the temperature Tb of the battery 50 input from the temperature sensor 51c. The input limit Win denotes a maximum allowable power (negative value) to charge the battery 50. The output limit Wout denotes a maximum allowable power (positive value) to be discharged from the battery 50.

The stepped transmission 60 is configured as a four-speed stepped transmission. This stepped transmission 60 includes the input shaft 61, an output shaft 62, planetary gears 63, 64 and 65, clutches C1 and C2, and brakes B1, B2 and B3. The input shaft 61 is connected with the ring gear 30r of the planetary gear 30 and with the motor MG2 via the transmission member 32 as described above. The output shaft 62 is connected with a driveshaft 36 that is linked with drive wheels 39a and 39b via a differential gear 38.

The planetary gear 63 is configured as a single pinion-type planetary gear mechanism. This planetary gear 63 includes a sun gear 63s as an external gear, a ring gear 63r as an internal gear, a plurality of pinion gears 63p respectively engaged with the sun gear 63s and the ring gear 63r, and a carrier 63c provided to support the plurality of pinion gears 63p to be rotatable on their axes and revolvable.

The planetary gear 64 is configured as a single pinion-type planetary gear mechanism. This planetary gear 64 includes a sun gear 64s as an external gear, a ring gear 64r as an internal gear, a plurality of pinion gears 64p respectively engaged with the sun gear 64s and the ring gear 64r, and a carrier 64c provided to support the plurality of pinion gears 64p to be rotatable on their axes and revolvable.

The planetary gear 65 is configured as a single pinion-type planetary gear mechanism. This planetary gear 65 includes a sun gear 65s as an external gear, a ring gear 65r as an internal gear, a plurality of pinion gears 65p respectively engaged with the sun gear 65s and the ring gear 65r, and a carrier 65c provided to support the plurality of pinion gears 65p to be rotatable on their axes and revolvable.

The sun gear 63s of the planetary gear 63 and the sun gear 64s of the planetary gear 64 are linked with (fixed to) each other. The ring gear 63r of the planetary gear 63, the carrier 64c of the planetary gear 64 and the carrier 65c of the planetary gear 65 are linked with one another. The ring gear 64r of the planetary gear 64 and the sun gear 65s of the planetary gear 65 are linked with each other. Accordingly, the planetary gears 63, 64 and 65 serve as five element-type mechanism using the sun gear 63s of the planetary gear 63 with the sun gear 64s of the planetary gear 64; the carrier 63c of the planetary gear 63; the ring gear 65r of the planetary gear 65; the ring gear 63r of the planetary gear 63 with the carrier 64c of the planetary gear 64 and the carrier 65c of the planetary gear 65; and the ring gear 64r of the planetary gear 64 with the sun gear 65s of the planetary gear 65, as five rotational elements. The ring gear 63r of the planetary gear 63, the carrier 64c of the planetary gear 64 and the carrier 65c of the planetary gear 65 are linked with the output shaft 62.

The clutch C1 is configured to connect and disconnect the input shaft 61 with and from the ring gear 64r of the planetary gear 64 and the sun gear 65s of the planetary gear 65. The clutch C2 is configured to connect and disconnect the input shaft 61 with and from the sun gear 63s of the planetary gear 63 and the sun gear 64s of the planetary gear 64.

The brake B1 is configured to fix (connect) the sun gear 63s of the planetary gear 63 and the sun gear 64s of the planetary gear 64 to (with) a transmission case 69 such as to be not rotatable and to release the sun gear 63s and the sun gear 64s from the transmission case 69 such as to be rotatable. The brake B2 is configured to fix (connect) the carrier 63c of the planetary gear 63 to and from the transmission case 69 such as to be not rotatable and to release the carrier 63c from the transmission case 69 such as to be rotatable. The brake B3 is configured to fix (connect) the ring gear 65r of the planetary gear 65 to (with) the transmission case 69 such as to be not rotatable and to release the ring gear 65r from the transmission case 69 such as to be rotatable.

The clutches C1 and C2 are respectively configured as, for example, hydraulically actuated multiple disc clutches. The brake B1 is configured as, for example, a hydraulically actuated band brake. The brakes B2 and B3 are respectively configured as, for example, hydraulically actuated multiple disc brakes. The clutches C1 and C2 and the brakes B1, B2 and B3 are operated through supply and discharge of hydraulic oil by a hydraulic controller (not shown). The hydraulic controller is controlled by the HVECU 70.

Figure 4:
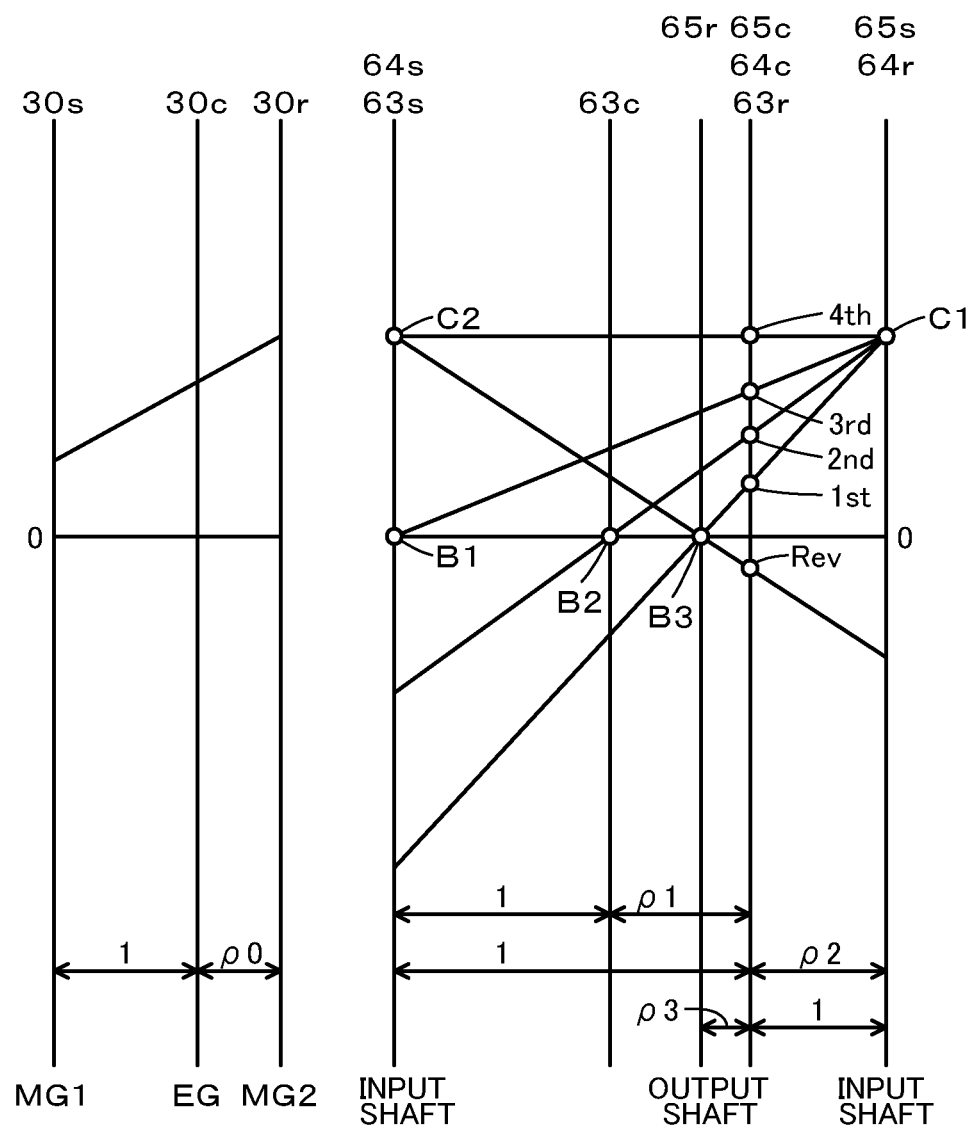
FIG. 4 is alignment charts showing a relationship among the rotation speeds of respective rotational elements of the planetary gear and a relationship among the rotation speeds of respective rotational elements of the stepped transmission.

FIG. 3 is an operation table showing a relationship between the respective speeds of the stepped transmission 60 and the states of the clutches C1 and C2 and the brakes B1, B2 and B3. FIG. 4 is alignment charts showing a relationship among the rotation speeds of the respective rotational elements of the planetary gear 30 and a relationship among the rotation speeds of the respective rotational elements of the stepped transmission 60. In the charts of FIG. 4, "ρ0" denotes a gear ratio of the planetary gear 30 (the number of teeth of the sun gear 30s/the number of teeth of the ring gear 30r), "ρ1" denotes a gear ratio of the planetary gear 63 (the number of teeth of the sun gear 63s/the number of teeth of the ring gear 63r), "ρ2" denotes a gear ratio of the planetary gear 64 (the number of teeth of the sun gear 64s/the number of teeth of the ring gear 64r), and "ρ3" denotes a gear ratio of the planetary gear 65 (the number of teeth of the sun gear 65s/the number of teeth of the ring gear 65r).

In FIG. 4, the left side is the alignment chart of the planetary gear 30, and the right side is the alignment chart of the stepped transmission 60. In the alignment chart of the planetary gear 30, a 30s axis indicates a rotation speed of the sun gear 30s that is equal to a rotation speed Nm1 of the motor MG1. A 30c axis indicates a rotation speed of the carrier 30c that is equal to a rotation speed Ne of the engine 22. A 30r axis indicates a rotation speed of the ring gear 30r that is equal to a rotation speed Nm2 of the motor MG2, a rotation speed of the transmission member 32, and a rotation speed of the input shaft 61. In the alignment chart of the stepped transmission 60, a 63s-64s axis indicates rotation speeds of the sun gear 63s of the planetary gear 63 and of the sun gear 64s of the planetary gear 64. A 63c axis indicates a rotation speed of the carrier 63c of the planetary gear 63. A 65r axis indicates a rotation speed of the ring gear 65r of the planetary gear 65. A 63r-64c-65c axis indicates rotation speeds of the ring gear 63r of the planetary gear 63, of the carrier 64c of the planetary gear 64 and of the carrier 65c of the planetary gear 65 that are equal to a rotation speed Nd of the driveshaft 36 (i.e., a rotation speed of the output shaft 62). A 64r-65s axis indicates rotation speeds of the ring gear 64r of the planetary gear 64 and of the sun gear 65s of the planetary gear 65.

In the stepped transmission 60, the clutches C1 and C2 and the brakes B1, B2 and B3 are engaged and disengaged to provide forward gear ratios of a first speed to a fourth speed and a reverse gear ratio as shown in FIG. 3. More specifically, the forward gear ratio of the first speed is provided by engaging the clutch C1 and the brake B3 and disengaging the clutch C2 and the brakes B1 and B2. The forward gear ratio of the second speed is provided by engaging the clutch C1 and the brake B2 and disengaging the clutch C2 and the brakes B1 and B3. The forward gear ratio of the third speed is provided by engaging the clutch C1 and the brake B1 and disengaging the clutch C2 and the brakes B2 and B3. The forward gear ratio of the fourth speed is provided by engaging the clutches C1 and C2 and disengaging the brakes B1, B2 and B3. The reverse gear ratio is provided by engaging the clutch C2 and the brake B3 and disengaging the clutch C1 and the brakes B1 and B2.

The HVECU 70 includes a microcomputer including a CPU, a ROM, a RAM, input/output ports, and a communication port. Signals from various sensors are input into the HVECU 70 via the input port. The signals input into the HVECU 70 include, for example, a rotation speed Nd of the driveshaft 36 from a rotation speed sensor 36a configured to detect the rotation speed of the driveshaft 36, an ignition signal from an ignition switch 80 and a shift position SP from a shift position sensor 82 configured to detect an operating position of a shift lever 81. The signals input into the HVECU 70 also include an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85. The signals input into the HVECU 70 further include a vehicle speed V from a vehicle speed sensor 88, a road surface gradient Ord from a gradient sensor 89 (which has a positive value in the case of an uphill road), and a mode signal from a mode switch 90. The HVECU 70 outputs various control signals via the output port. The signals output from the HVECU 70 include, for example, a control signal to the stepped transmission 60 (hydraulic controller). The HVECU 70 is connected with the engine ECU 24, the motor ECU 40 and the battery ECU 52 via the respective communication ports as described above.

The shift position SP herein includes a parking position (P position), a reverse position (R position), a neutral position (N position) and a drive position (D position).

The mode switch 90 serves as a switch operated by the driver to select a working drive mode out of a plurality of drive modes including an ordinary mode that gives priority to the fuel consumption and a drivability priority mode that gives priority to the driver's drive feeling (drivability) over the fuel consumption. When the ordinary mode is selected as the working drive mode, the engine 22 and the motors MG1 and MG2 are driven and controlled, such that the hybrid vehicle 20 is driven with efficiently operating the engine 22 at the shift position SP set to the D position. When the drivability priority mode is selected as the working drive mode, on the other hand, the engine 22 and the motors MG1 and MG2 are driven and controlled, such that the hybrid vehicle 20 is driven with operating the engine 22 as if the engine 22 is connected with the driveshaft 36 via a virtual 10-speed stepped transmission (hereinafter referred to as "simulated transmission") at the shift position SP set to the D position. The respective gear ratios of the ten-speed simulated transmission are configured such that two virtual gear ratios are provided with regard to each of the gear ratios of the first to the third speeds of the four-speed stepped transmission 60.

The hybrid vehicle 20 of the embodiment including the configuration described above is driven by hybrid drive (HV drive) with operation of the engine 22 or by electric drive (EV drive) without operation of the engine 22.

Figure 5:
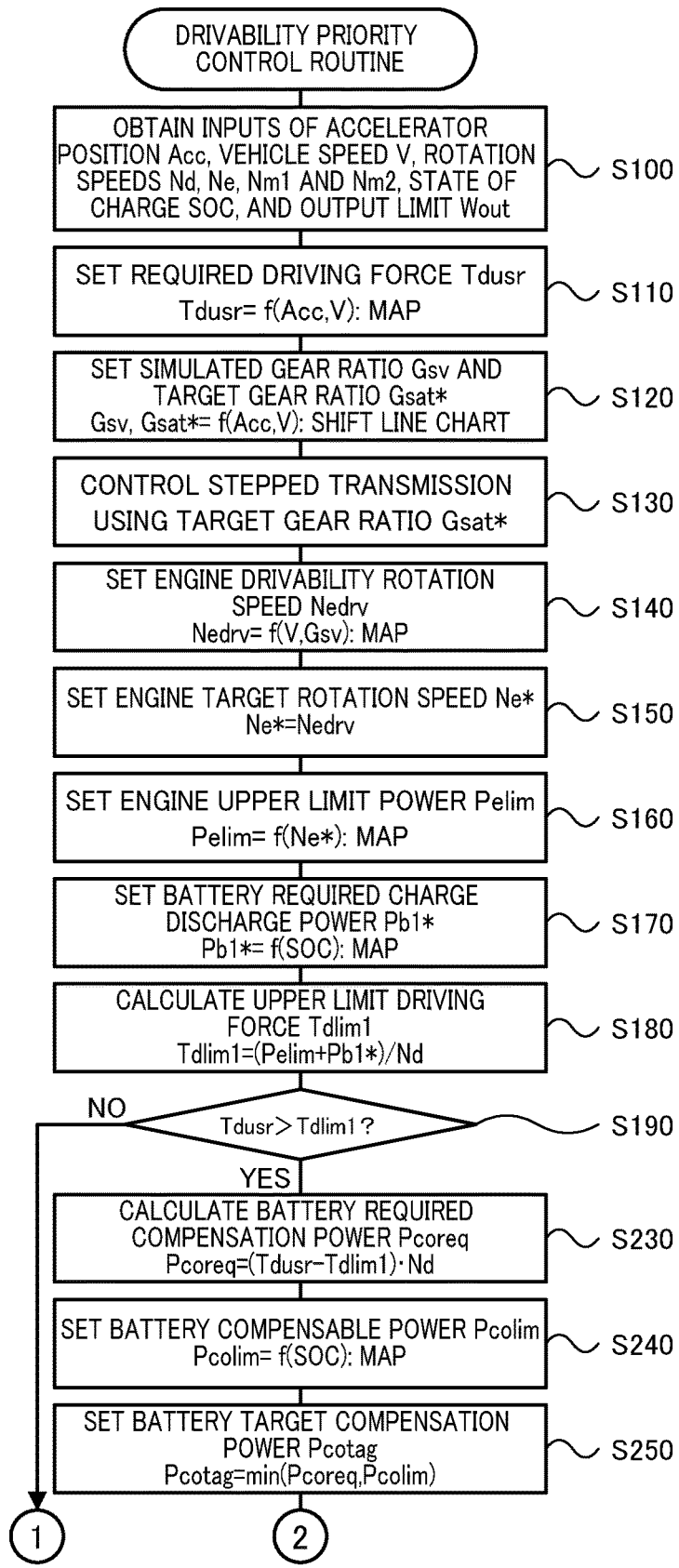
FIG. 5 is a flowchart showing one example of a drivability priority control routine (first half)
Figure 6:
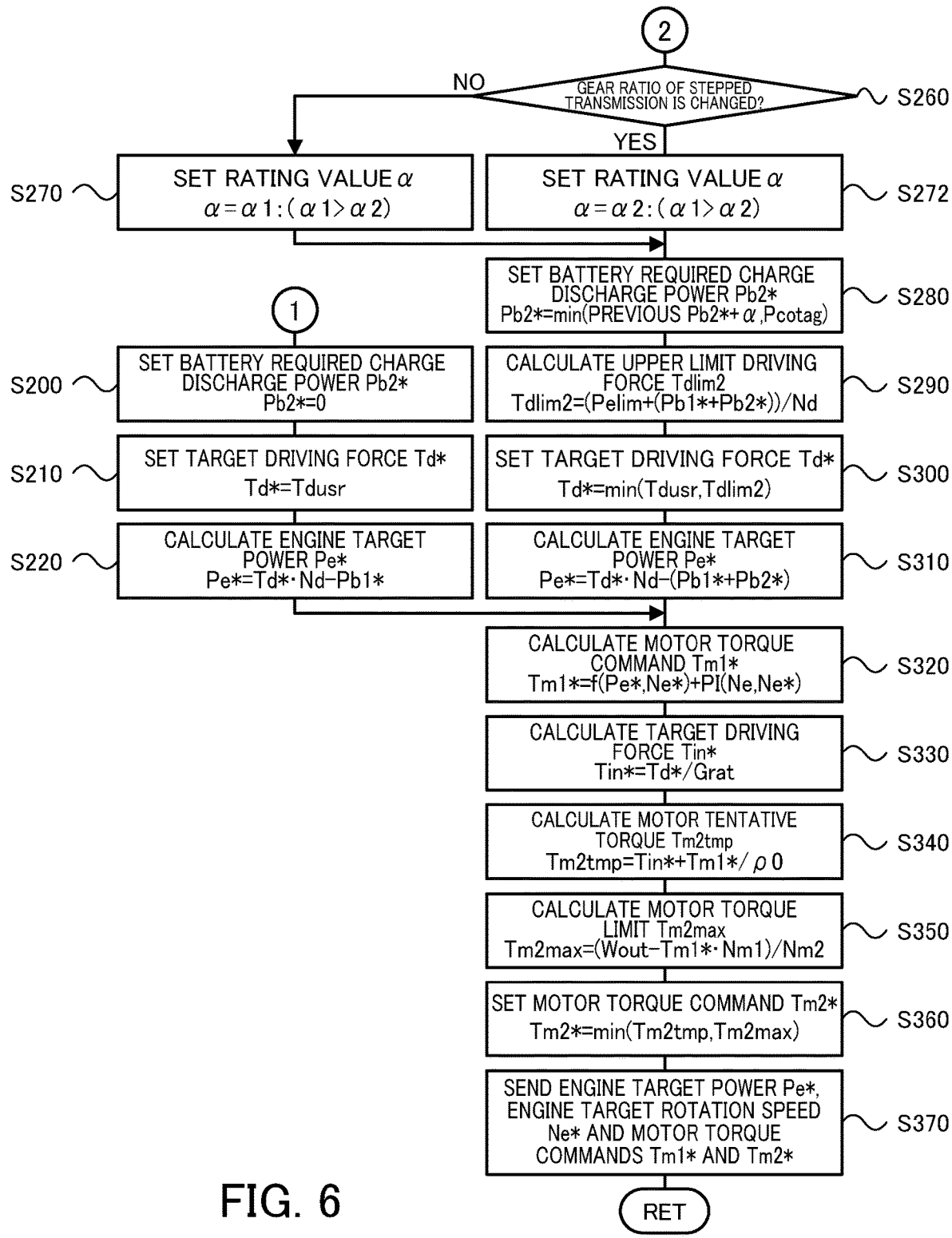
FIG. 6 is a flowchart showing one example of the drivability priority control routine (latter half)

The following describes the operations of the hybrid vehicle 20 configured as described above or more specifically a series of operations when the hybrid vehicle 20 is driven by HV drive at the shift position SP set to the D position with selection of the drivability priority mode as the working drive mode by the driver's operation of the mode switch 90. FIG. 5 and FIG. 6 are flowcharts showing one example of a drivability priority control routine performed by the HVECU 70. This routine is performed repeatedly when the hybrid vehicle 20 is driven by HV drive at the shift position SP set to the D position with selection of the drivability priority mode as the working drive mode by the driver's operation of the mode switch 90.

When the drivability priority control routine of FIGS. 5 and 6 is triggered, the HVECU 70 first obtains input data of, for example, the accelerator position Acc, the vehicle speed V, the rotation speed Nd of the driveshaft 36, the rotation speed Ne of the engine 22, the rotation speeds Nm1 and Nm2 of the motors MG1 and MG2 and the state of charge SOC and the output limit Wout of the battery 50 (step S100). The accelerator position Acc input here is a value detected by the accelerator pedal position sensor 84. The vehicle speed V input here is a value detected by the vehicle speed sensor 88. The rotation speed Nd of the driveshaft 36 input here is a value detected by the rotation speed sensor 36a. The rotation speed Ne of the engine 22 input here is a value calculated by the engine ECU 24. The rotation speeds Nm1 and Nm2 of the motors MG1 and MG2 input here are values calculated by the motor ECU 40. The state of charge SOC and the output limit Wout of the battery 50 input here are values calculated by the battery ECU 52.

Figure 7:
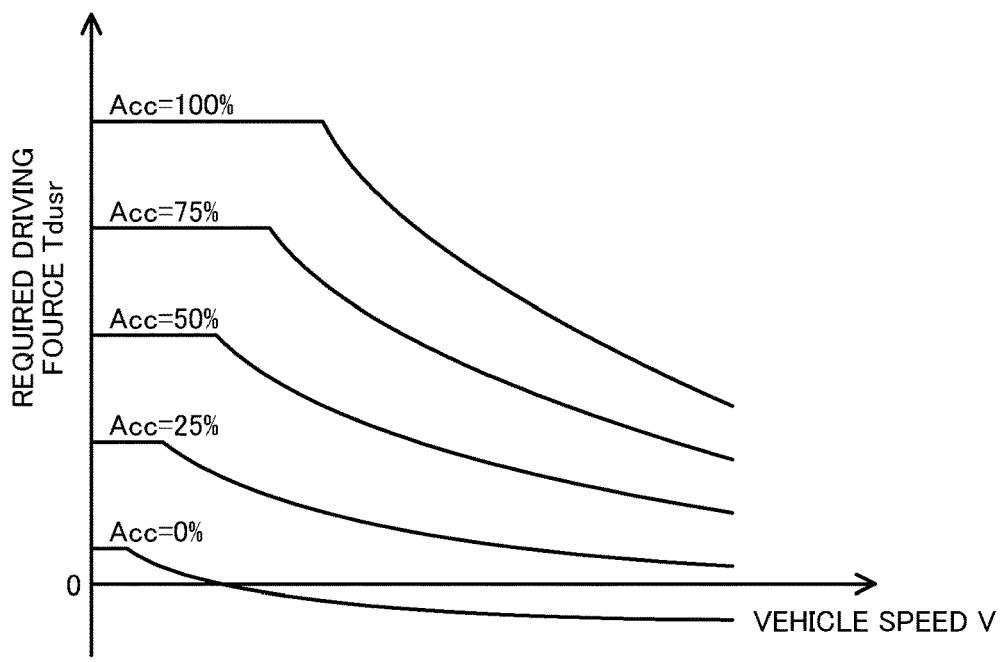
FIG. 7 is a diagram illustrating one example of a required driving force setting map.

The HVECU 70 sets a required driving force Tdusr that is required for driving (required for the driveshaft 36) according to a required driving force setting map by using the accelerator position Acc and the vehicle speed V (step S110). The required driving force setting map is set in advance to specify a relationship among the accelerator position Acc, the vehicle speed V and the required driving force Tdusr and is stored in the non-illustrated ROM. FIG. 7 is a diagram illustrating one example of the required driving force setting map.

The HVECU 70 subsequently sets a simulated gear ratio Gsv and a target gear ratio Gsat* according to a gear shift line chart by using the accelerator position Acc and the vehicle speed V (step S120). The simulated gear ratio Gsv denotes a gear ratio of the ten-speed simulated transmission. The target gear ratio Gsat* denotes a target gear ratio of the four-speed stepped transmission 60. The gear shift line chart is set in advance to specify a relationship among the accelerator position Acc, the vehicle speed V, the simulated gear ratio Gsv and the target gear ratio Gsat*.

Figure 8:
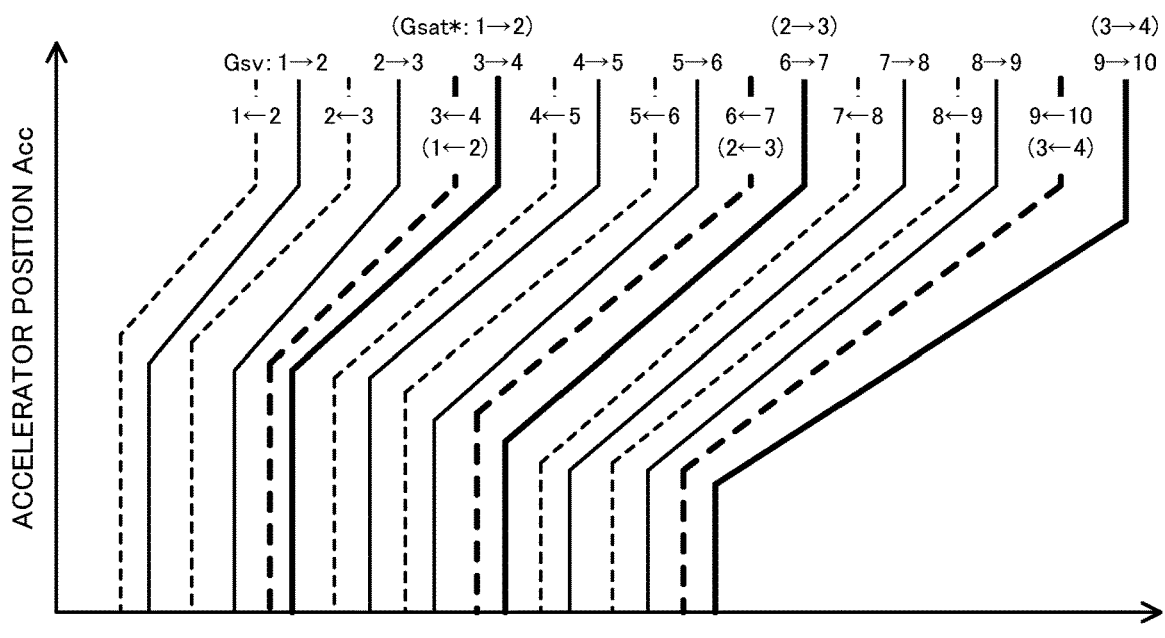
FIG. 8 is a diagram illustrating one example of a gear shift line chart.

FIG. 8 is a diagram illustrating one example of the gearshift line chart. In the diagram, solid lines (thin solid lines and thick solid lines) indicate gear shift lines for upshift, and broken lines (thin broken lines and thick broken lines) indicate gear shift lines for downshift. The simulated gear ratio Gsv is set as one of the respective gear ratios of the ten speeds to be corresponded to, based on all the gear shift lines shown in FIG. 8. The target gear ratio Gsat* is set as one of the respective gear ratios of the four speeds to be corresponded to, based on the gear shift lines of the thick solid lines and the thick broken lines shown in FIG. 8.

After setting the target gear ratio Gsat*, the HVECU 70 controls the stepped transmission 60 by using the target gear ratio Gsat* (step S130). When a gear ratio Gsat is equal to the target gear ratio Gsat*, the stepped transmission 60 keeps the gear ratio Gsat unchanged. When the gear ratio Gsat is different from the target gear ratio Gsat*, on the other hand, the stepped transmission 60 changes the gear ratio Gsat, such that the gear ratio Gsat becomes equal to the target gear ratio Gsat*. The stepped transmission 60 is similarly controlled when the hybrid vehicle 20 is driven by HV drive or by EV drive with selection of the ordinary mode as the working drive mode. The process of changing the gear ratio Gsat takes the longer time than the execution cycle of this routine.

The gear ratio Gsat is changed, for example, in the following manner. The HVECU 70 first performs a first stage release control with regard to a release side element that switches from engaged state to disengaged state accompanied with the change of the gear ratio Gsat among the clutches C1 and C2 and the brakes B1, B2, and B3 of the stepped transmission 60. Further, the HVECU 70 performs a stroke control with regard to an engagement side element that switches from the disengaged state to the engaged state among the clutches C1 and C2 and the brakes B1, B2, and B3 of the stepped transmission 60. The first stage release control is a control in which a hydraulic pressure is reduced by one stage and the release side element is slip-engaged. The stroke control is a control that performs a fast fill that fills a gap between a piston of the engagement side element and a friction engagement plate (stroke the piston), and subsequently performs a low-pressure standby that holds the hydraulic pressure at a relatively low standby pressure.

The HVECU 70 subsequently performs a second stage release control with regard to the release side element, and performs a torque phase control with regard to the engagement side element. The second stage release control and the torque phase control are controls that gradually reduce the hydraulic pressure of the release side element, gradually increase the hydraulic pressure of the engagement side element, and change a torque transmission from a torque transmission by a gear ratio before the change to a torque transmission by the gear ratio after the change.

The HVECU 70 subsequently performs a third stage release control with regard to the release side element, and performs an inertia phase control and a terminal control in this order with regard to the engagement side element. The third stage release control is a control that further reduces the hydraulic pressure of the release side element. The inertia phase control is a control that further gradually increases the hydraulic pressure of the engagement side element to bring the rotation speed Nin of the input shaft 61 of the stepped transmission 60 close to the rotation speed corresponding to the target gear ratio Gsat*. The terminal control is a control that further increases the hydraulic pressure of the engagement side element.

After setting the simulated gear ratio Gsv at step S120, the HVECU 70 sets a drivability rotation speed Nedrv of the engine 22 according to a drivability rotation speed setting map by using the vehicle speed V and the simulated gear ratio Gsv (step S140). The HVECU 70 subsequently sets a target rotation speed Ne* of the engine 22 to the drivability rotation speed Nedrv of the engine 22 (step S150). The drivability rotation speed setting map is set in advance to specify a relationship among the vehicle speed V, the simulated gear ratio Gsv and the drivability rotation speed Nedrv of the engine 22 and is stored in the non-illustrated ROM.

Figure 9:
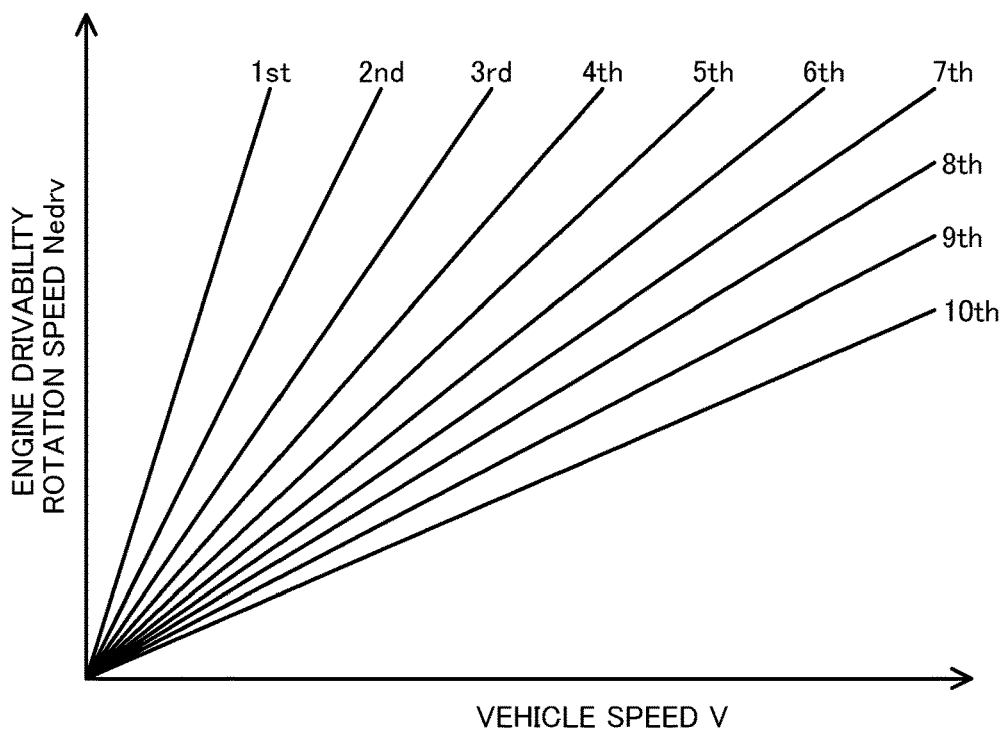
FIG. 9 is a diagram illustrating one example of a drivability rotation speed setting map.

FIG. 9 is a diagram illustrating one example of the drivability rotation speed setting map. As illustrated, the drivability rotation speed Nedrv of the engine 22 is set to linearly increase with an increase in the vehicle speed V at each of the simulated gear ratios Gsv of the ten-speed simulated transmission and to provide the smaller slope against the vehicle speed V at the larger simulated gear ratio Gsv of this simulated transmission. When the engine 22 is operated at the drivability rotation speed Nedrv, such setting causes the rotation speed Ne of the engine 22 to increase with an increase in the vehicle speed V at each of the simulated gear ratios Gsv of the ten-speed simulated transmission. The rotation speed Ne of the engine 22 decreases in the course of upshift of the simulated gear ratio Gsv and increases in the course of downshift of the simulated gear ratio Gsv. As a result, the hybrid vehicle 20 causes the behavior of the rotation speed Ne of the engine 22 to become closer to the behavior of an engine rotation speed of a motor vehicle equipped with an actual ten-speed stepped transmission.

Figure 10:
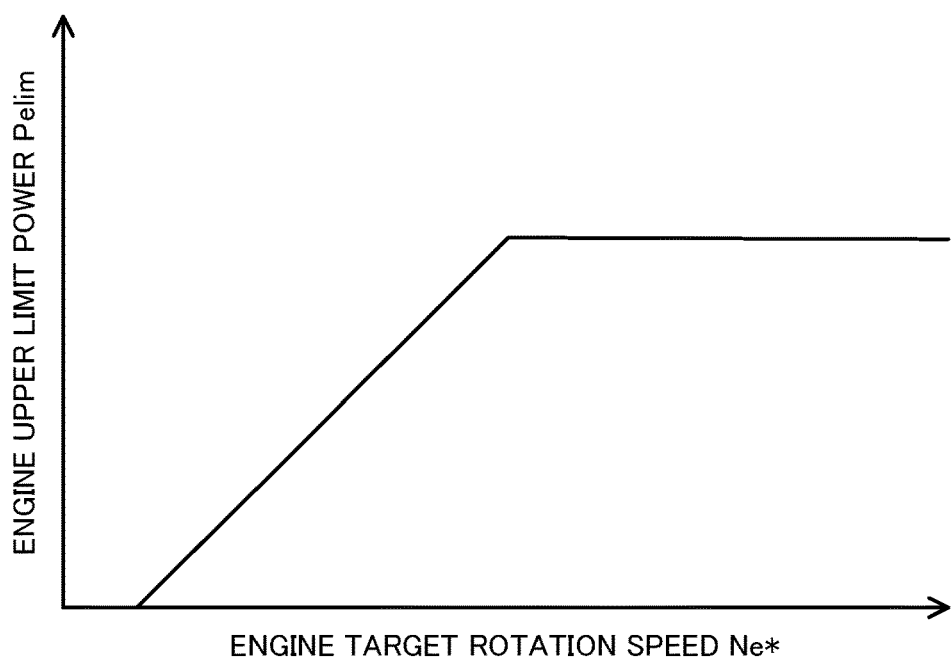
FIG. 10 is a diagram illustrating one example of an upper limit power setting map.

After setting the target rotation speed Ne* of the engine 22, the HVECU 70 sets an upper limit power Pelim of the engine 22 according to an upper limit power setting map by using the target rotation speed Ne* of the engine 22 (step S160). The upper limit power Pelim of the engine 22 denotes an upper limit of power that can be output from the engine 22 when the engine 22 is operated at the target rotation speed Ne* (drivability rotation speed Nedrv). The upper limit power setting map is set in advance to specify a relationship between the target rotation speed Ne* and the upper limit power Pelim of the engine 22 and is stored in the non-illustrated ROM. FIG. 10 is a diagram illustrating one example of the upper limit power setting map. As illustrated, the upper limit power Pelim of the engine 22 is set to increase with an increase in the target rotation speed Ne* of the engine 22.

The HVECU 70 subsequently sets a required charge discharge power Pb1* of the battery 50 (which has a positive value when the battery 50 is discharged) such that the state of charge SOC of the battery 50 becomes closer to a target state of charge SOC*, according to a required charge discharge power setting map by using the state of charge SOC of the battery 50 (step S170). The required charge discharge power setting map is set in advance to specify a relationship between the state of charge SOC and the required charge discharge power Pb1* of the battery 50 and is stored in the non-illustrated ROM.

Figure 11:
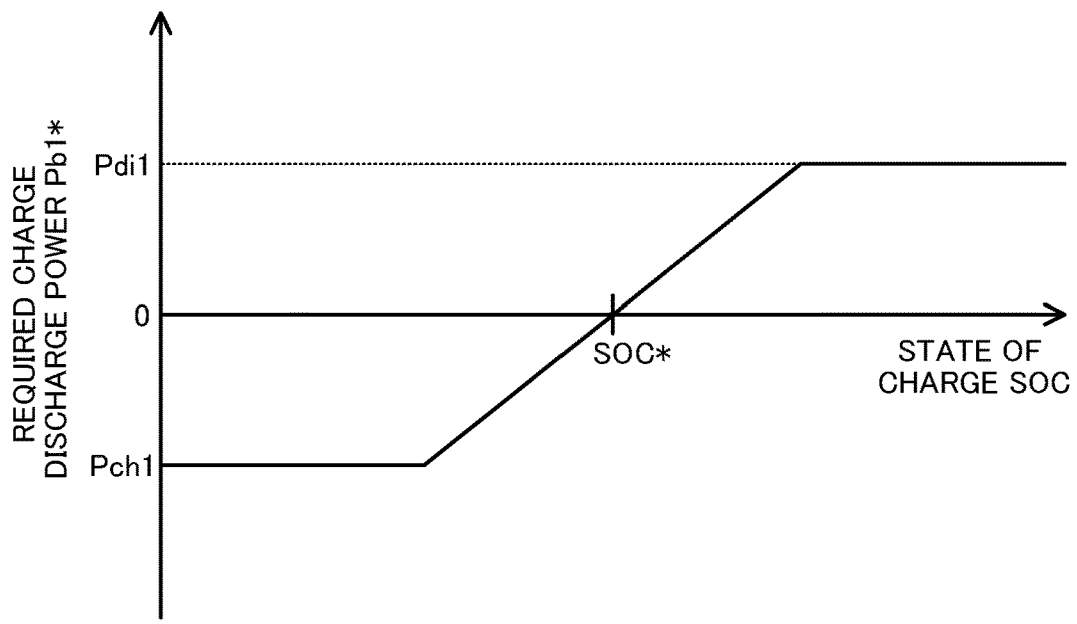
FIG. 11 is a diagram illustrating one example of a required charge discharge power setting map.

FIG. 11 is a diagram illustrating one example of the required charge discharge power setting map. As illustrated, when the state of charge SOC of the battery 50 is equal to the target state of charge SOC*, the required charge discharge power Pb1* of the battery 50 is set to a value 0. Furthermore, when the state of charge SOC is higher than the target state of charge SOC*, the required charge discharge power Pb1* is set to increase from a value 0 to a predetermined discharging (positive) power Pdi1 with an increase in the state of charge SOC and to be kept constant at the predetermined power Pdi1. Moreover, when the state of charge SOC is lower than the target state of charge SOC*, the required charge discharge power Pb1* is set to decrease from the value 0 to a predetermined charging (negative) power Pch1 with a decrease in the state of charge SOC and to be kept constant at the predetermined power Pch1.

The HVECU 70 subsequently calculates an upper limit driving force Tdlim1 by dividing the sum of the upper limit power Pelim of the engine 22 and the required charge discharge power Pb1* of the battery 50 by the rotation speed Nd of the driveshaft 36 according to Expression (1) given below (step S180). The upper limit driving force Tdlim1 denotes an upper limit of driving force that can be output to the driveshaft 36 when the upper limit power Pelim is output from the engine 22 that is operated at the target rotation speed Ne* (drivability rotation speed Nedrv) and the battery 50 is charged or discharged with the required charge discharge power Pb1*. In Expression (1), the required charge discharge power Pb1* of the battery 50 is added to the upper limit power Pelim of the engine 22, with a view to suppressing a variation in power output from the engine 22 when the battery 50 is charged or discharged with the required charge discharge power Pb1*.

$$Td\text{lim}1 = (P\text{elim} + Pb1^*)/Nd \qquad (1)$$

The HVECU 70 subsequently compares the required driving force Tdusr with the upper limit driving force Tdlim1 (step S190). Such comparison is a process of determining whether or not the required driving force Tdusr can be output to the driveshaft 36, accompanied with charge or discharge of the battery 50 with the required charge discharge power Pb1*.

When the required driving force Tdusr is equal to or smaller than the upper limit driving force Tdlim1, the HVECU 70 determines that the required driving force Tdusr can be output to the driveshaft 36, accompanied with charge or discharge of the battery 50 with the required charge discharge power Pb1*. The HVECU 70 then sets a required charge discharge power Pb2* as the working compensation power of the battery 50 (which has a positive value when the battery 50 is discharged) to a value 0 (step S200). The HVECU 70 subsequently sets a target driving force Td* that is to be output to the driveshaft 36 to the required driving force Tdusr (step S210). The details of the required charge discharge power Pb2* of the battery 50 will be described later.

The HVECU 70 subsequently calculates a target power Pe* that is to be output from the engine 22 by subtracting the required charge discharge power Pb1* of the battery 50 from the product of the target driving force Td* and the rotation speed Nd of the driveshaft 36 according to Expression (2) given below (step S220). In Expression (2), the product of the target driving force Td* and the rotation speed Nd of the driveshaft 36 denotes a target power Pd* that is to be output to the driveshaft 36. The target power Pe* of the engine 22 obtained by Expression (2) denotes a power of the engine 22 required to output the target driving force Td* to the driveshaft 36, accompanied with charge or discharge of the battery 50 with the required charge discharge power Pb1*. Furthermore, in this state, the required driving force Tdusr is equal to or smaller than the upper limit driving force Tdlim1. By taking into account Expression (1) and Expression (2), it is understood that the target power Pe* of the engine 22 is equal to or smaller than the upper limit power Pelim.

$$Pe^* = Td^* \cdot Nd - Pd1^* \qquad (2)$$

After setting the target power Pe* and the target rotation speed Ne* of the engine 22, the HVECU 70 calculates a torque command Tm1* of the motor MG1 according to Expression (3) given below by using the rotation speed Ne, the target rotation speed Ne* and the target power Pe* of the engine 22 and the gear ratio ρ0 of the planetary gear 30 (step S320). Expression (3) is a relational expression of feedback control to rotate the engine 22 at the target rotation speed Ne*. In Expression (3), a first term on the right side is a feedforward term, a second term on the right side is a proportional of a feedback term, and a third term on the right side is an integral term of the feedback term. The first term on the right side indicates a torque that causes the motor MG1 to receive a torque output from the engine 22 and applied to the rotating shaft of the motor MG1 via the planetary gear 30. In Expression (3), "kp" of the second term on the right side denotes a gain of the proportional, and "ki" of the third term on the right side denotes a gain of the integral term.

$$Tm1^* = -(Pe^*/Ne^*) \cdot [\rho 0/(1+\rho 0)] + kp \cdot (Ne^* - Ne) + ki \cdot \int (Ne^* - Ne) dt \qquad (3)$$

The HVECU 70 subsequently calculates a target driving force Tin* that is to be output to the input shaft 61 of the stepped transmission 60 by dividing the target driving force Td* by a gear ratio Grat of the stepped transmission 60 (step S330). The gear ratio Grat of the stepped transmission 60 used here is, for example, a value obtained by dividing the rotation speed Nm2 of the motor MG2 (i.e., the rotation speed of the input shaft 61 of the stepped transmission 60) by the rotation speed Nd of the driveshaft 36.

The HVECU 70 subsequently calculates a tentative torque Tm2tmp that is a tentative value of a torque command Tm2* of the motor MG2 by subtracting a torque (−Tm1*/ρ0) from the target driving force Tin* according to Expression (4) given below (step S340). in Expression (4), the torque (−Tm1*/ρ0) denotes a torque output from the motor MG1 and applied to the driveshaft 36 via the planetary gear 30 when the motor MG1 is driven with the torque command Tm1*.

$$Tm2tmp = Tin^* + Tm1^*/\rho 0 \qquad (4)$$

The HVECU 70 subsequently calculates a torque limit Tm2max of the motor MG1 by subtracting the product of the torque command Tm1* and the rotation speed Nm1 of the motor MG2 from the output limit Wout of the battery 50 and dividing the difference by the rotation speed Nm2 of the motor MG2 according to Expression (5) given below (step S350). In Expression (5), the product of the torque command Tm1* and the rotation speed Nm1 of the motor MG1 denotes an electric power of the motor MG1 (which has a positive value when the motor MG1 is power-driven). The HVECU 70 then sets the torque command Tm2* of the motor MG2 to the smaller between the tentative torque Tm2tmp and the torque limit Tm2max of the motor MG2 according to Expression (6) given below (step S360).

$$Tm2max = (Wout - Tm1^* \cdot Nm1)/Nm2 \qquad (5)$$

$$Tm2^* = \min(Tm2tmp, Tm2max) \qquad (6)$$

After obtaining the target power Pe* and the target rotation speed Ne* of the engine 22 and the torque commands Tm1* and Tm2* of the motors MG1 and MG2, the HVECU 70 sends the target power Pe* and the target rotation speed Ne* of the engine 22 to the engine ECU 24 and sends the torque commands Tm1* and Tm2* of the motors MG1 and MG2 to the motor ECU 40 (step S370) and then terminates this routine.

When receiving the target power Pe* and the target rotation speed Ne* of the engine 22, the engine ECU 24 performs operation control of the engine 22 (for example, intake air flow control, fuel injection control and ignition control), such that the engine 22 is operated based on the target power Pe* and the target rotation speed Ne*. When receiving the torque commands Tm1* and Tm2* of the motors MG1 and MG2, the motor ECU 40 performs switching control of the plurality of switching elements included in the inverters 41 and 42, such that the motors MG1 and MG2 are respectively driven with the torque commands Tm1* and Tm2*.

When the required driving force Tdusr is equal to or smaller than the upper limit driving force Tdlim1, the HVECU 70 in cooperation with the engine ECU 24 and the motor ECU 40 controls the engine 22 and the motors MG1 and MG2, such that the engine 22 is operated at the target rotation speed Ne* (drivability rotation speed Nedrv) and that the target driving force Td* set to the required driving force Tdusr is output to the driveshaft 36 in the range of the output limit Wout of the battery 50.

When the required driving force Tdusr is larger than the upper limit driving force Tdlim1 at step S190, on the other hand, the HVECU 70 determines that the required driving force Tdusr cannot be output to the driveshaft 36, accompanied with charge or discharge of the battery 50 with the required charge discharge power Pb1*. In this state, the HVECU 70 determines that there is a requirement for battery power compensation. The battery power compensation aims to make the driving force that can be output to the driveshaft 36 larger than the upper limit driving force Tdlim1 by charging or discharging the battery 50 with such an electric power that is larger on the discharge side (that is smaller on the charge side) than the required charge discharge power Pb1*.

The HVECU 70 subsequently calculates a required compensation power Pcoreq of the battery 50 by subtracting the upper limit driving force Tdlim1 from the required driving force Tdusr and multiplying the difference by the rotation speed Nd of the driveshaft 36 according to Expression (7) given below (step S230). The HVECU 70 subsequently sets a compensable power Pcolim (i.e., a power allowed to compensate for a shortage) of the battery 50 in a range of not higher than the output limit Wout of the battery 50 according to a compensable power setting map by using the state of charge SOC of the battery 50 (step S240). The compensable power setting map is set in advance to specify a relationship between the state of charge SOC and the compensable power Pcolim of the battery 50 and is stored in the non-illustrated ROM.

$$Pcoreq = (Tdusr - Tdlim1) \cdot Nd \qquad (7)$$

Figure 12:
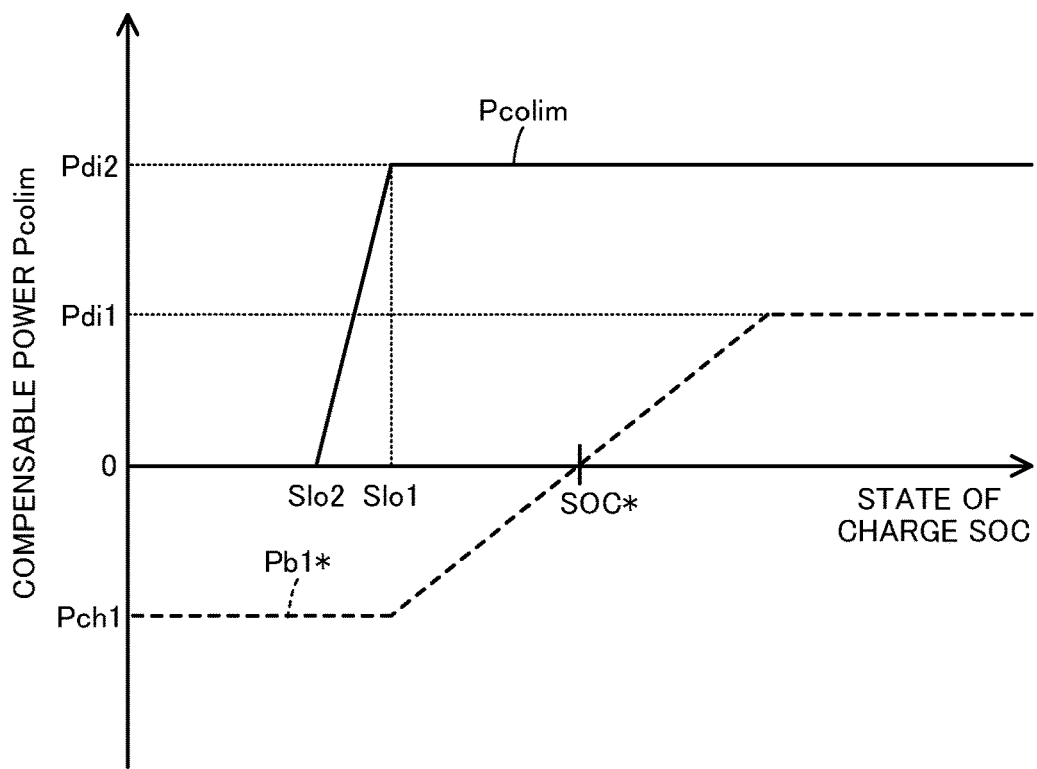
FIG. 12 is a diagram illustrating one example of a compensable power setting map.

FIG. 12 is a diagram illustrating one example of the compensable power setting map. As illustrated, when the state of charge SOC of the battery 50 is equal to or higher than a reference value Slo1 that is smaller than the target state of charge SOC*, the compensable power Pcolim of the battery 50 is set to a predetermined discharging power Pdi2 that is sufficiently larger than the predetermined power Pdi1 described above. When the state of charge SOC is lower than the reference value Slo1 and is also higher than a reference value Slo2 that is smaller than the reference value Slo1, the compensable power Pcolim is set to decrease from the predetermined power Pdi2 to a value 0 with a decrease in the state of charge SOC. Additionally, when the state of charge SOC is equal to or lower than the reference value Slo2, the compensable power Pcolim is set to the value 0.

After obtaining the required compensation power Pcoreq and the compensable power Pcolim of the battery 50, the HVECU 70 sets a target compensation power Pcotag of the battery 50 to the smaller between the required compensation power Pcoreq and the compensable power Pcolim of the battery 50 according to Expression (8) given below (step S250).

$$Pcotag = \min(Pcoreq, Pcolim) \qquad (8)$$

The HVECU 70 subsequently determines whether the gear ratio Gsat of the stepped transmission 60 is changed (shifted) (step S260). The gear ratio Gsat is changed, for example, after the gear shift Gsat and the target gear ratio Gsat* are different (after it is determined that the gear position Gsat is changed) until the inertia phase control starts or until the change of the gear ratio Gsat is completed. The battery power compensation is required and the gear ratio Gsat is not changed, when the battery power compensation is required due to a change in the simulated gear ratio Gsv while keeping the gear ratio Gsat unchanged (for example, a change from the forward gear ratio of the second speed to the third speed), or when the battery power compensation is required while keeping the simulated gear ratio Gsv and the target gear ratio Gsat* unchanged, for example.

When it is determined at step S260 that the gear ratio Gsat of the stepped transmission 60 is not changed, the HVECU 70 sets a rating value α to a relatively large predetermined value α1 (step S270). When it is determined that the gear ratio Gsat of the stepped transmission 60 is changed, on the other hand, the HVECU 70 sets the rating value α to a predetermined value α2 that is smaller than the predetermined value α1 (step S272). The reason of such setting of the rating value α will be described later.

The HVECU 70 subsequently sets the required charge discharge power Pb2* as the working compensation power of the battery 50 to the smaller between a value obtained by adding the rating value α to a previous required charge discharge power (previous working compensation power: previous Pb2*) and the target compensation power Pcotag of the battery 50 according to Expression (9) given below (step S280). Such setting of step S280 is a process of calculating the required charge discharge power Pb2* of the battery 50 by a rating process of the target compensation power Pcotag of the battery 50 using the rating value α.

$$Pb2^*=\min(\text{Previous } Pb2^*+\alpha, P\text{cotag}) \quad (9)$$

Accordingly, when the requirement for battery power compensation is ongoing, the HVECU 70 repeatedly performs this routine, so as to gradually increase the required charge discharge power Pb2* of the battery 50 toward the target compensation power Pcotag of the battery 50 by using the rating value α. In the embodiment, as the HVECU 70 uses a smaller rating value α when the gear ratio Gsat of the stepped transmission 60 is changed compared to when the gear ratio Gsat is not changed, the HVECU 70 gradually increases the required charge discharge power Pb2* of the battery 50. After the required charge discharge power Pb2* of the battery 50 reaches the target compensation power Pcotag, the HVECU 70 gradually decreases the required charge discharge power Pb2* of the battery 50 (to a value 0) with a gradual decrease in the difference between the required driving force Tdusr and the upper limit driving force Tdlim1 (to a value 0), i.e., a gradual decrease in the target compensation power Pcotag.

After obtaining the required charge discharge power Pb2* of the battery 50, the HVECU 70 calculates an upper limit driving force Tdlim2 by dividing a total sum of the upper limit power Pelim of the engine 22 and the required charge discharge powers Pb1* and Pb2* of the battery 50 by the rotation speed Nd of the driveshaft 36 according to Expression (10) given below (step S290).

$$T\text{dlim2}=(P\text{elim}+(Pb1^*+Pb2^*))/Nd \quad (10)$$

The upper limit driving force Tdlim2 denotes an upper limit of driving force that can be output to the driveshaft 36 when the upper limit power Pelim is output from the engine 22 that is operated at the target rotation speed Ne* (drivability rotation speed Nedrv) and the battery 50 is charged or discharged with the total power of the required charge discharge powers Pb1* and Pb2*. This upper limit driving force Tdlim2 differs from the upper limit driving force Tdlim1 described above, since the upper limit driving force Tdlim2 is determined by taking into account the required charge discharge power Pb2* of the battery 50. In Expression (10), the sum of the required charge discharge powers Pb1* and Pb2* of the battery 50 is added to the upper limit power Pelim of the engine 22, with a view to suppressing a variation in power output from the engine 22 when the battery 50 is charged or discharged with the total power of the required charge discharge powers Pb1* and Pb2*.

After obtaining the upper limit driving force Tdlim2, the HVECU 70 sets the target driving force Td* to the smaller between the required driving force Tdusr and the upper limit driving force Tdlim2 according to Expression (11) given below (step S300). The HVECU 70 subsequently calculates the target power Pe* of the engine 22 by subtracting the sum of the required charge discharge powers Pb1* and Pb2* of the battery 50 from the product of the target driving force Td* and the rotation speed Nd of the driveshaft 36 according to Expression (12) given below (step S310), performs the processing of steps S320 to S370 and then terminates this routine.

$$Td^*=\min(Tdusr,T\text{dlim2}) \quad (11)$$

$$Pe^*=Td^*\cdot Nd-(Pb1^*+Pb2^*) \quad (12)$$

The target power Pe* of the engine 22 obtained by Expression (12) denotes a power of the engine 22 required to output the target driving force Td* to the driveshaft 36, accompanied with charge or discharge of the battery 50 with the total power of the required charge discharge powers Pb1* and Pb2*. The HVECU 70 sets the target driving force Td* to the smaller between the required driving force Tdusr and the upper limit driving force Tdlim2. By taking into account Expression (10) and Expression (12) given above, it is accordingly understood that the target power Pe* of the engine 22 becomes equal to or smaller than the upper limit power Pelim. Additionally, the processing of steps S290, S300 and S330 to S360 causes the required charge discharge power Pb2* of the battery 50 to be reflected on the upper limit driving force Tdlim2, the target driving force Td*, the target driving force Tin* and the torque command Tm2* of the motor MG2 and thereby to be reflected on the driving force output to the driveshaft 36.

The HVECU 70 performs the control described above to set the upper limit driving force Tdlim2, based on the total sum of the upper limit power Pelim of the engine 22 and the required charge discharge powers Pb1* and Pb2* of the battery 50, when the required driving force Tdusr is larger than the upper limit driving force Tdlim1. The HVECU 70 in cooperation with the engine ECU 24 and the motor ECU 40 controls the engine 22 and the motors MG1 and MG2, such that the engine 22 is operated at the target rotation speed Ne* (drivability rotation speed Nedrv) and that the target driving force Td* set to the smaller between the required driving force Tdusr and the upper limit driving force Tdlim2 is output to the driveshaft 36 in the range of the output limit Wout of the battery 50. The hybrid vehicle 20 enables a larger driving force than the upper limit driving force Tdlim1 to be output to the driveshaft 36 by charging or discharging the battery 50 with the total power of the required charge discharge powers Pb1* and Pb2*. In other words, battery power compensation is performed in the hybrid vehicle 20. The hybrid vehicle 20 accordingly suppresses a reduction of the driving force output to the driveshaft 36 when the upper limit driving force Tdlim1 decreases in the course of upshift of the simulated gear ratio Gsv to become smaller than the required driving force Tdusr. As a result, the hybrid vehicle 20 suppresses deterioration of the driver's drive feeling.

Further, in the case where the required driving force Tdusr is larger than the upper limit driving force Tdlim1, when the gear ratio Gsat of the stepped transmission 60 is changed (shifted), the HVECU 70 increases the required charge discharge power Pb2* of the battery 50 toward the required compensation power Pcoreq by using the smaller rating value α compared to when the gear ratio Gsat is not changed. Accordingly, the hybrid vehicle 20 of the present disclosure further suppresses the variation of the driving force output to the drive shaft 36 with the change of the gear ratio Gsat of the stepped transmission 60, and suppresses the gear shift shock.

Figure 13:
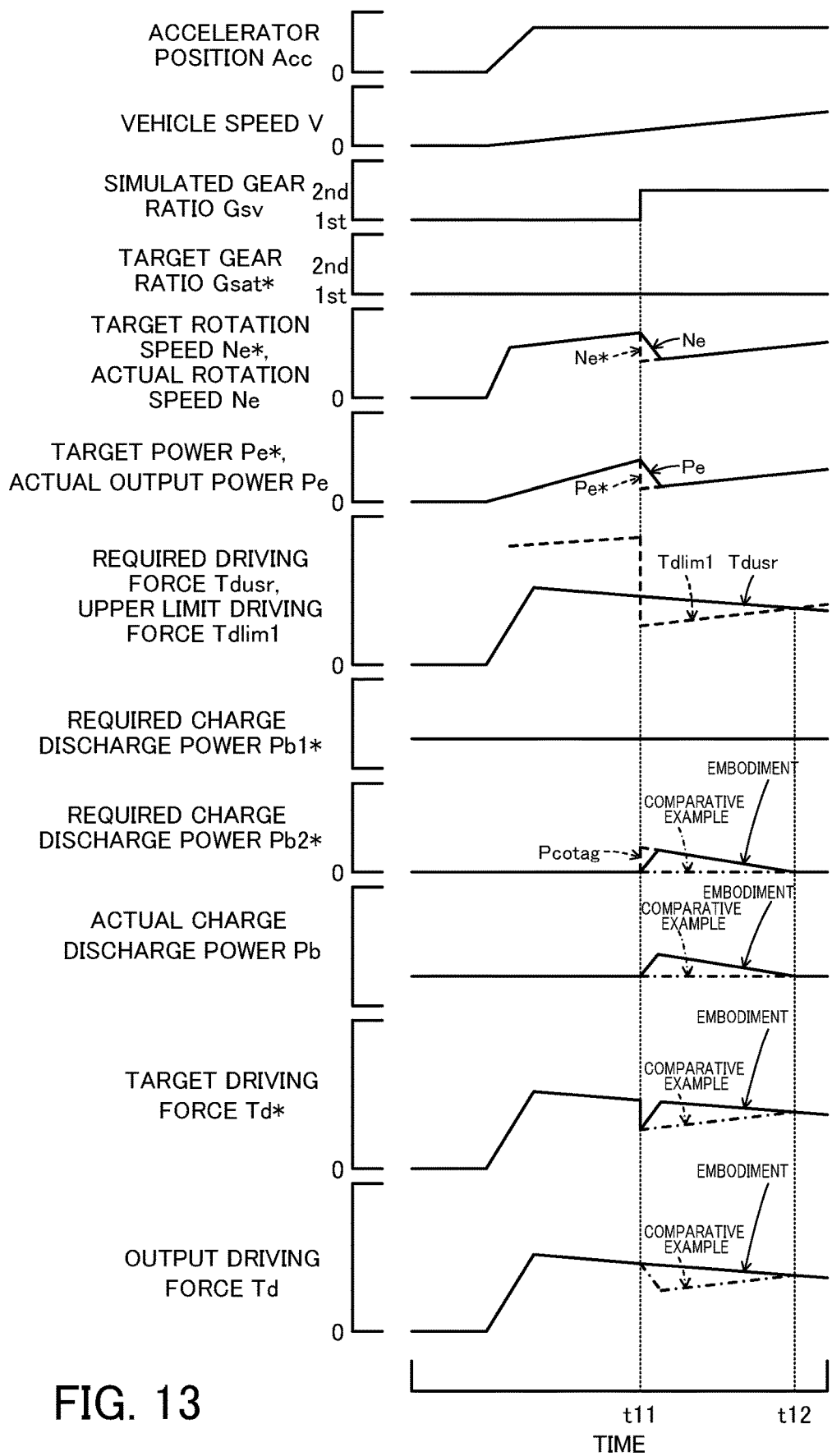
FIG. 13 is a diagram illustrating one example of variations in an accelerator position Acc, a vehicle speed V, a simulated gear ratio Gsv, a target gear ratio Gsat*, a target rotation speed Ne* and an actual rotation speed Ne of the engine, a target power Pe* and an actual output power Pe of the engine, a required driving force Tdusr, an upper limit driving force Tdlim1, a required charge discharge power Pb1* and Pb2* and an actual charge discharge power Pb of the battery, a target driving force Td*, and an output driving force Td when the gear ratio Gsat of the stepped transmission is not changed.

FIG. 13 is a diagram illustrating one example of variations in the accelerator position Acc, the vehicle speed V, the simulated gear ratio Gsv, the target gear ratio Gsat*, the target rotation speed Ne* and the actual rotation speed Ne of the engine 22, the target power Pe* and the actual output power Pe of the engine 22, the required driving force Tdusr, the upper limit driving force Tdlim1, the required charge discharge power Pb1* and Pb2* and the actual charge discharge power Pb of the battery 50, the target driving force Td*, and the actual driving force output to the drive shaft 36 (output driving force Td) when the gear ratio Gsat of the stepped transmission 60 is not changed. In this diagram, the target compensation power Pcotag of the battery 50 is additionally shown in the graph of the required charge discharge power Pb2* of the battery 50 for the purpose of reference. In the diagram, solid line curves indicate variations of the embodiment and one-dot chain line curves indicate variations of a comparative example with regard to the required charge discharge power Pb2* and the charge discharge power Pb of the battery 50, the target driving force Td* and the output driving force Td. The comparative example is a case where the required charge discharge power Pb2* of the battery 50 is not taken into account, i.e., a case where the required charge discharge power Pb2* of the battery 50 is set to the value 0 irrespective of the magnitude relationship between the required driving force Tdusr and the upper limit driving force Tdlim1 and where the upper limit driving forces Tdlim1 and Tdlim2 are equal to each other.

As illustrated, the comparative example has a reduction of the output driving force Td relative to the required driving force Tdusr for a time period when the required driving force Tdusr is equal to or larger than the upper limit driving force Tdlim1 after the upper limit driving force Tdlim1 decreases in the course of upshift of the simulated gear ratio Gsv to become smaller than the required driving force Tdusr (for a time period of t11 to t12). The reduction of the output driving force Td relative to the required driving force Tdusr differs from the reduction of the target driving force Td* relative to the required driving force Tdusr based on a response delay of the rotation speed Ne and the output power Pe relative to the target rotation speed Ne* and the target power Pe* of the engine 22.

In the embodiment, on the other hand, when the upper limit driving force Tdlim1 decreases in the course of upshift of the simulated gear ratio Gsv to become smaller than the required driving force Tdusr (at a time t11), the required charge discharge power Pb2* and accordingly the charge discharge power Pb of the battery 50 increase toward the target compensation power Pcotag to reach the target compensation power Pcotag, so that the target driving force Td* and accordingly the output driving force Td become larger than the upper limit driving force Tdlim1 (for a time period of t11 to t12). The hybrid vehicle 20 of this configuration accordingly suppresses a reduction of the output driving force Td relative to the required driving force Tdusr.

Figure 14:
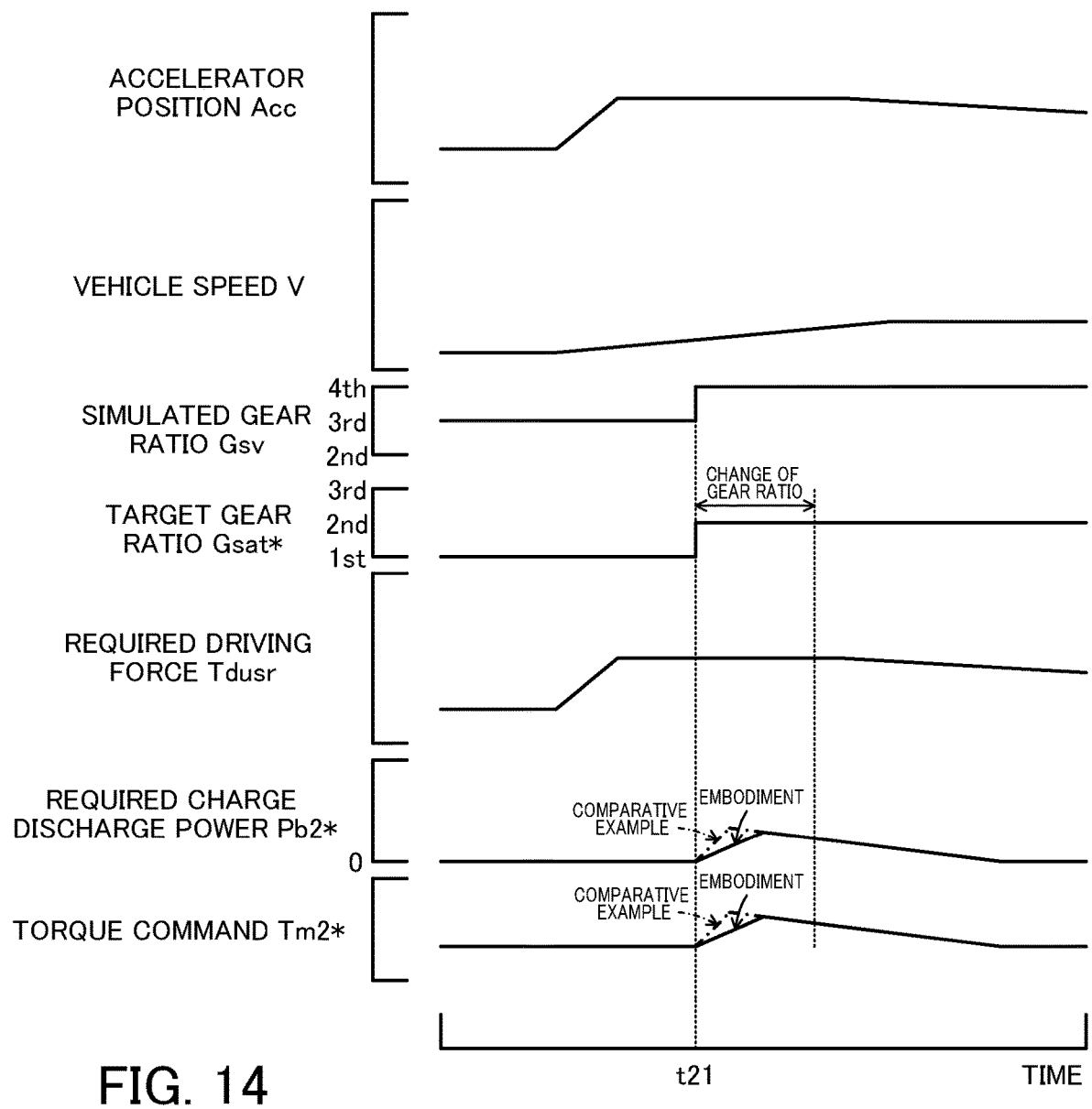
FIG. 14 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery, and a torque command Tm2* of the motor MG2 when the gear ratio Gsat of the stepped transmission is upshifted.

FIG. 14 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery 50, and a torque command Tm2* of the motor MG2 when the gear ratio Gsat of the stepped transmission 60 is upshifted. In the diagram, solid line curves indicate variations of the embodiment and one-dot chain line curves indicate variations of a comparative example with regard to the required charge discharge power Pb2* of the battery 50 and the torque command Tm2* of the motor MG2. As the comparative example, the rating value α is set to the predetermined value α1 even when the gear ratio Gsat of the stepped transmission 60 is changed, which is the same as when the gear stage Gsat is not changed.

As illustrated, in the comparative example, when the requirement for the battery power compensation is started accompanied with the upshift of the simulated gear ratio Gsv and the target gear ratio Gsat* (at a time t21), the rating value α is set to the relatively large predetermined value α1, and the required charge discharge power Pb2* of the battery 50 is increased toward the target compensation power Pcotag by using the set rating value α. Accordingly, the increase of the required charge discharge power Pb2* of the battery 50 and accordingly the increase of the torque command Tm2* of the motor MG2 (increase of the torque output to the input shaft 61 of the stepped transmission 60 from the motor MG2) becomes relatively abrupt. The variation of the output driving force Td that is output to the drive shaft 36 may occur with the change of the gear ratio Gsat of the stepped transmission 60, and the gear shift shock may be caused.

In the embodiment, on the other hand, when the requirement for the battery power compensation is started accompanied with the upshift of the simulated gear ratio Gsv and the target gear ratio Gsat* (at a time t21), the rating value α is set to the predetermined value α2, that is smaller than the predetermined value α1, and the required charge discharge power Pb2* of the battery 50 is increased toward the target compensation power Pcotag by using the set rating value α. Accordingly, compared to the comparative example, the increase of the required charge discharge power Pb2* of the battery 50 and accordingly the increase of the torque command Tm2* of the motor MG2 (increase of the torque output to the input shaft 61 of the stepped transmission 60 from the motor MG2) becomes gradual. As a result, the hybrid vehicle 20 of the present disclosure suppresses the variation of the driving force output to the drive shaft 36 with the change of the gear ratio Gsat of the stepped transmission 60, and suppresses the gear shift shock.

In the hybrid vehicle 20 of the embodiment described above, in the case where the required driving force Tdusr becomes larger than the upper limit driving force Tdlim1 and the battery power compensation is required, the HVECU 70 increases the required charge discharge power Pb2* of the battery 50 toward the target compensation power Pcotag by using the smaller rating value α when the gear ratio Gsat of the stepped transmission 60 is changed, compared to when the gear ratio Gsat is not changed. As a result, the hybrid vehicle 20 of the present disclosure suppresses the variation of the driving force output to the drive shaft 36 with the change of the gear ratio Gsat of the stepped transmission 60, and suppresses the gear shift shock.

Figure 15:
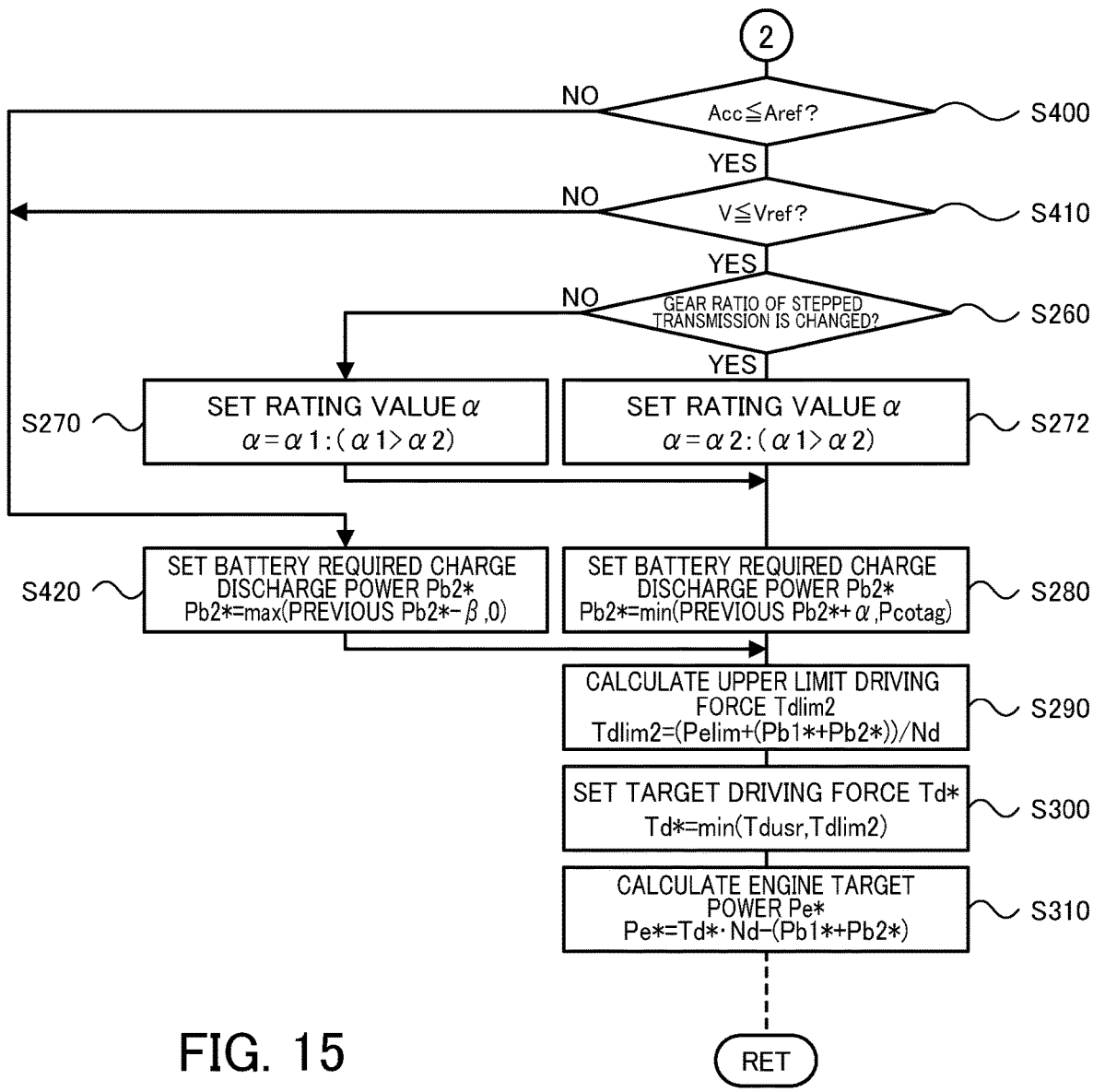
FIG. 15 is a flowchart showing one example of the drivability priority control routine (latter half) according to a modification.

In the hybrid vehicle 20 of the embodiment, the HVECU 70 performs the drivability priority control routine of FIG. 5 and FIG. 6. The HVECU 70 may, however, perform the drivability priority control routine (first half) of FIG. 5 and the drivability priority control routine (latter half) of FIG. 15. The drivability priority control routine of FIG. 15 is similar to the drivability priority control routine of FIG. 6, except addition of the processing of step S400 to S420. The description of the processing of the steps S200 to S220 and S320 to S370 of the drivability priority control routine of FIG. 15 are accordingly omitted.

After setting of the target compensation power Pcotag of the battery 50 at step S250 and before the processing of step S260 of the drivability priority control routine of FIG. 5, in the drivability priority control routine of FIG. 15, the HVECU 70 compares the accelerator position Acc with the reference value Aref (step S400) and compares the vehicle speed V with the reference value Vref (step S410). The reference value Aref is a reference value used to determine whether the driver is requesting a rapid acceleration. The reference value Vref is a reference value used to determine whether the vehicle is driven in a high speed.

In this state, the required driving force Tdusr is larger than the upper limit driving force Tdlim1 at step S190, that is, the battery power compensation is required. The battery power compensation is a processing in which the charge discharge power Pb of the battery 50 is increased to the discharge side (reduced to the charge side) so that the driving force that is larger than the upper limit driving force Tdlim1 can be output to the drive shaft 36 while maintaining quietness. It is considered that there is no need to perform the battery power compensation when the driver is requesting a rapid acceleration or the vehicle is driven in a high speed (the vehicle is driven with big road noise). The steps S400 and S401 are the process of determining whether the battery power compensation is needed.

When the accelerator position Acc is equal to or smaller than the reference value Aref at step S400 and the vehicle speed V is equal to or lower than the reference value Vref at step S410, the HVECU 70 determines that the battery power compensation is needed and performs the processing of and after step S260.

When the accelerator position Acc is larger than the reference value Aref at step S400 and the vehicle speed V is higher than the reference value Vref at step S410, the HVECU 70 determines that the battery power compensation is not needed, sets the required charge discharge power Pb2* of the battery 50 to the larger between the value determined by subtracting a rating value β from the previous working compensation power (previous Pb2*) of the battery 50 and the value 0 according to Expression (13) given below (step S420), and performs the processing of and after step S290. The rating value β is set in advance as a value to decrease the required charge discharge power Pb2* of the battery 50 to the value 0 abruptly (in a short time). The step S420 is a process to decrease the required charge discharge power Pb2* of the battery 50 to the value 0 to keep the required charge discharge power Pb2* at the value 0 by performing the rating process using the rating value β.

$$Pb2^* = \max(\text{Previous } Pb2^* - \beta, 0) \quad (13)$$

The HVECU 70 performs the control described above to decrease the required charge discharge power Pb2* of the battery 50 to the value 0 abruptly and terminate the battery power compensation when the accelerator position Acc becomes larger than the reference value Aref and the vehicle speed V becomes higher than the reference value Vref when the required charge discharge power Pb2* of the battery 50 has a positive value (performing the battery power compensation). This suppresses wasteful battery power compensation and also suppresses the decrease of state of charge SOC of the battery 50.

Figure 16:
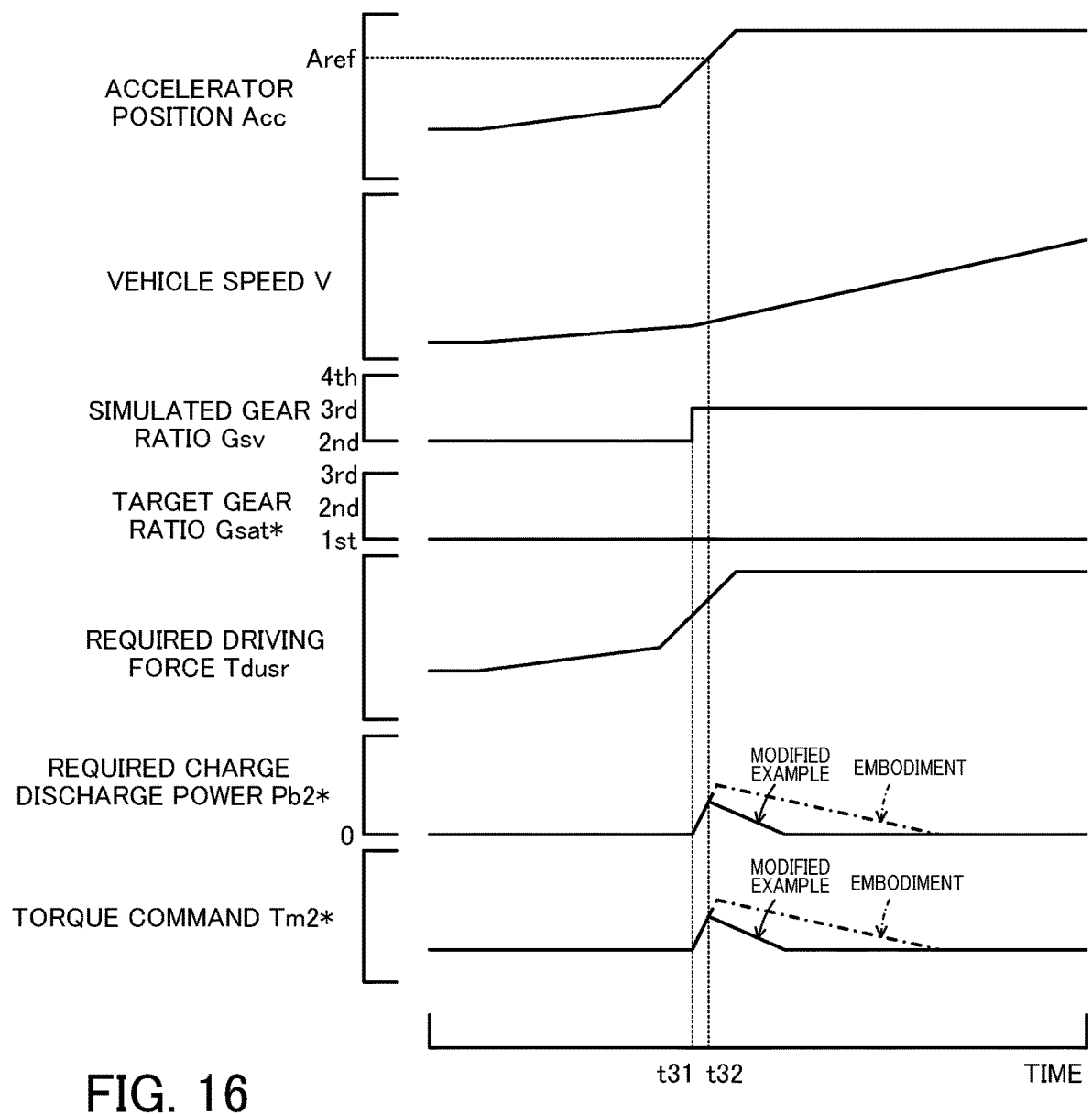
FIG. 16 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery, and the torque command Tm2* of the motor MG2 when the accelerator position Acc becomes larger than a reference value Aref during a battery power compensation.

FIG. 16 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery 50, and the torque command Tm2* of the motor MG2 when the accelerator position Acc becomes larger than the reference value Aref during the battery power compensation. In the diagram, solid line curves indicate variations of this modification (performing the drivability priority control routine of FIG. 5 and FIG. 15) and one-dot chain line curves indicate variations of the embodiment (performing the drivability priority control routine of FIG. 5 and FIG. 6) with regard to the required charge discharge power Pb2* of the battery 50 and the torque command Tm2* of the motor MG2.

As illustrated, in the modification, when the requirement for the battery power compensation is started accompanied with the upshift of the simulated gear ratio Gsv (at a time t31), the required charge discharge power Pb2* of the battery 50 is increased from the value 0. When the accelerator position Acc becomes larger than the reference value Aref when the required charge discharge power Pb2* of the battery 50 has a positive value (at a time t32), the required charge discharge power Pb2* of the battery 50 is decreased abruptly. This suppresses wasteful battery power compensation and also suppresses the decrease of state of charge SOC of the battery 50 compared with the embodiment.

In the modification, the HVECU 70 performs the drivability priority control routine (first half) of FIG. 5 and the drivability priority control routine (latter half) of FIG. 15. The HVECU 70 may, however, perform the drivability priority control routine (first half) of FIG. 5 and the drivability priority control routine (latter half) of FIG. 17. The drivability priority control routine of FIG. 17 is similar to the drivability priority control routine of FIG. 15, except addition of the processing of steps S500 and S510.

Figure 17:
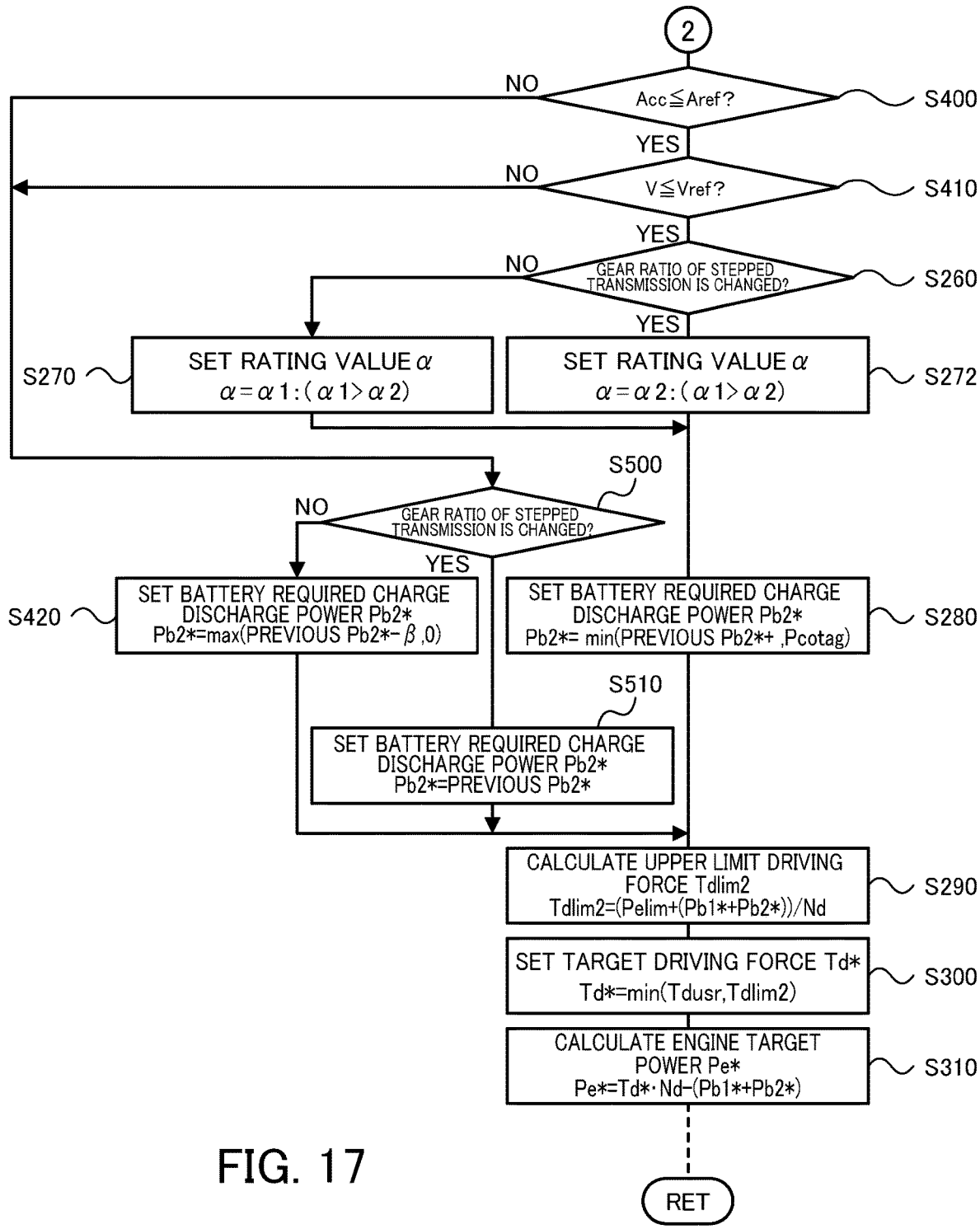
FIG. 17 is a flowchart showing one example of the drivability priority control routine (latter half) according to another modification.

In the drivability priority control routine of FIG. 17, when the accelerator position Acc is larger than the reference value Aref at step S400 or when the vehicle speed V is higher than the reference value Vref at step S410, the HVECU 70 determines, like the processing of step S260, whether the gear ratio Gsat of the stepped transmission 60 is changed (shifted) (step S500). When the gear ratio Gsat of the stepped transmission 60 is not changed, the HVECU 70 performs the processing of and after step S420.

When the gear ratio Gsat of the stepped transmission 60 is changed at step S500, the HVECU 70 sets a required charge discharge power Pb2* to the previous required charge discharge power (previous Pb2*) of the battery 50, that is, the HVECU 70 keeps the required charge discharge power Pb2* of the battery 50 (step S510), and performs the processing of and after step S290.

According to the control described above, when the accelerator position Acc is larger than the reference value Aref or when the vehicle speed V is higher than the reference value Vref while the battery power compensation is required, and when the gear ratio Gsat of the power transmission 60 is changed, the required charge discharge power Pb2* of the battery 50 is kept unchanged. This suppresses the required charge discharge power Pb2* and accordingly the torque command Tm2* of the motor MG2 (a torque output to the input shaft 61 of the stepped transmission 60 from the motor MG2) to be changed and also suppresses the driving force output to the drive shaft 36 to be changed when the gear ratio Gsat of the stepped transmission 60 is changed.

Figure 18:
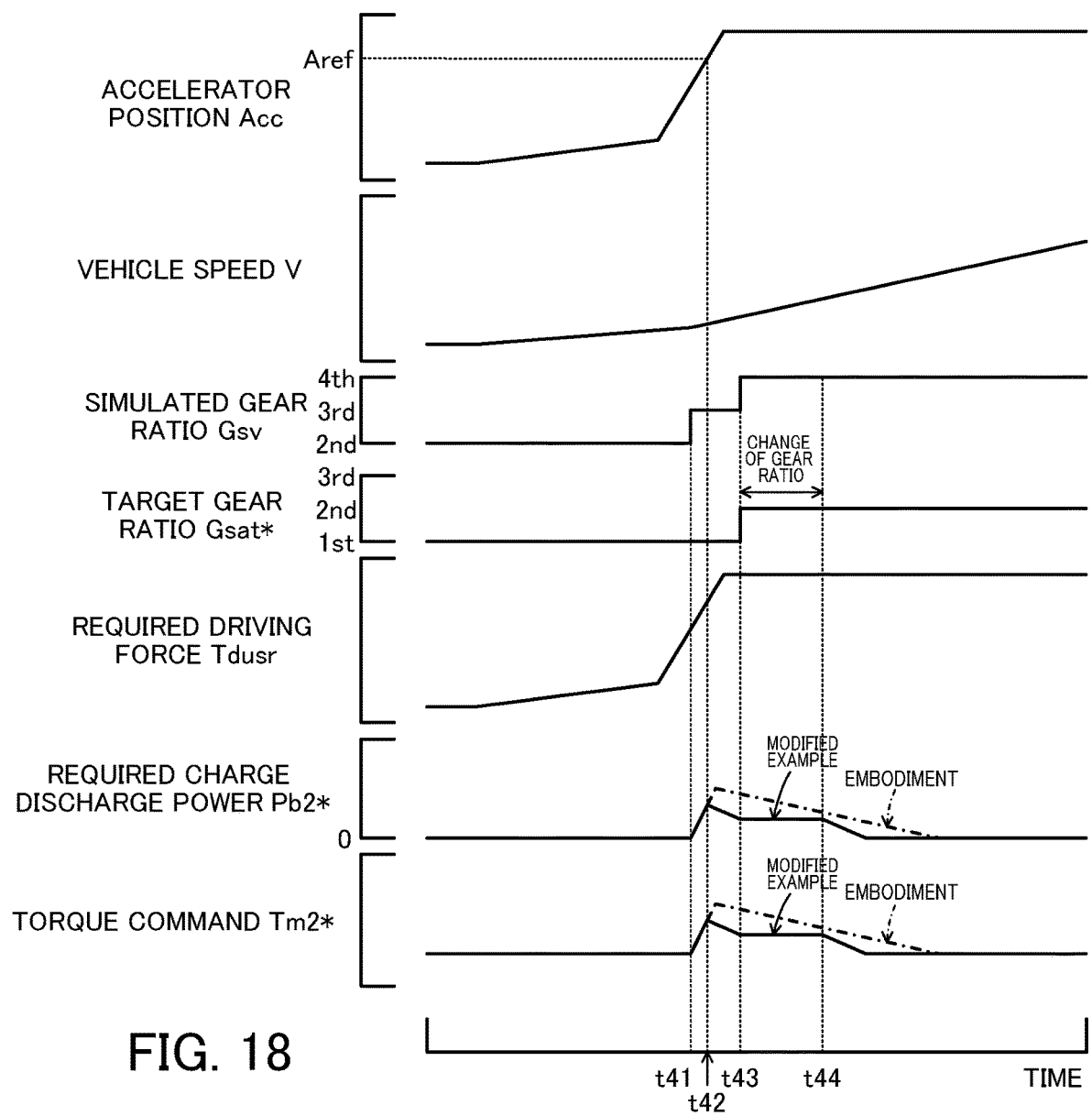
FIG. 18 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery, and the torque command Tm2* of the motor MG2 when the accelerator position Acc becomes larger than the reference value Aref during a battery power compensation, and subsequently, the charge discharge power Pb* of the battery has a positive value and the gear ratio Gsat of the stepped transmission is changed.

FIG. 18 is a diagram illustrating one example of variations in the accelerator position Acc, the vehicle speed V, the simulated gear ratio Gsv, the target gear ratio Gsat*, the required driving force Tdusr, the required charge discharge power Pb2* of the battery 50, and the torque command Tm2* of the motor MG2 when the accelerator position Acc becomes larger than the reference value Aref during a battery power compensation, and subsequently, the charge discharge power Pb* of the battery 50 has a positive value and the gear ratio Gsat of the stepped transmission 60 is changed. In the diagram, solid line curves indicate variations of this modification (performing the drivability priority control routine of FIG. 5 and FIG. 15) and one-dot chain line curves indicate variations of the embodiment (performing the drivability priority control routine of FIG. 5 and FIG. 6) with regard to the required charge discharge power Pb2* of the battery 50 and the torque command Tm2* of the motor MG2.

As illustrated, in the modification, when the requirement for the battery power compensation is started accompanied with the upshift of the simulated gear ratio Gsv (at a time t41), the required charge discharge power Pb2* of the battery 50 is increased from the value 0. When the accelerator position Acc becomes larger than the reference value Aref when the required charge discharge power Pb2* of the battery 50 has a positive value (at a time t42), the required charge discharge power Pb2* of the battery 50 is decreased abruptly. When the required charge discharge power Pb2* of the battery 50 has a positive value, the target gear ratio Gsat* is upshifted, and the gear ratio Gsat is upshifted (for a time period of t43 to t44), the required charge discharge power Pb2* of the battery 50 is kept unchanged. This suppresses the required charge discharge power Pb2* and accordingly the torque command Tm2* of the motor MG2 (a torque output to the input shaft 61 of the stepped transmission 60 from the motor MG2) to be changed and also suppresses the driving force output to the drive shaft 36 to be changed when the gear ratio Gsat of the stepped transmission 60 is changed.

Figure 19:
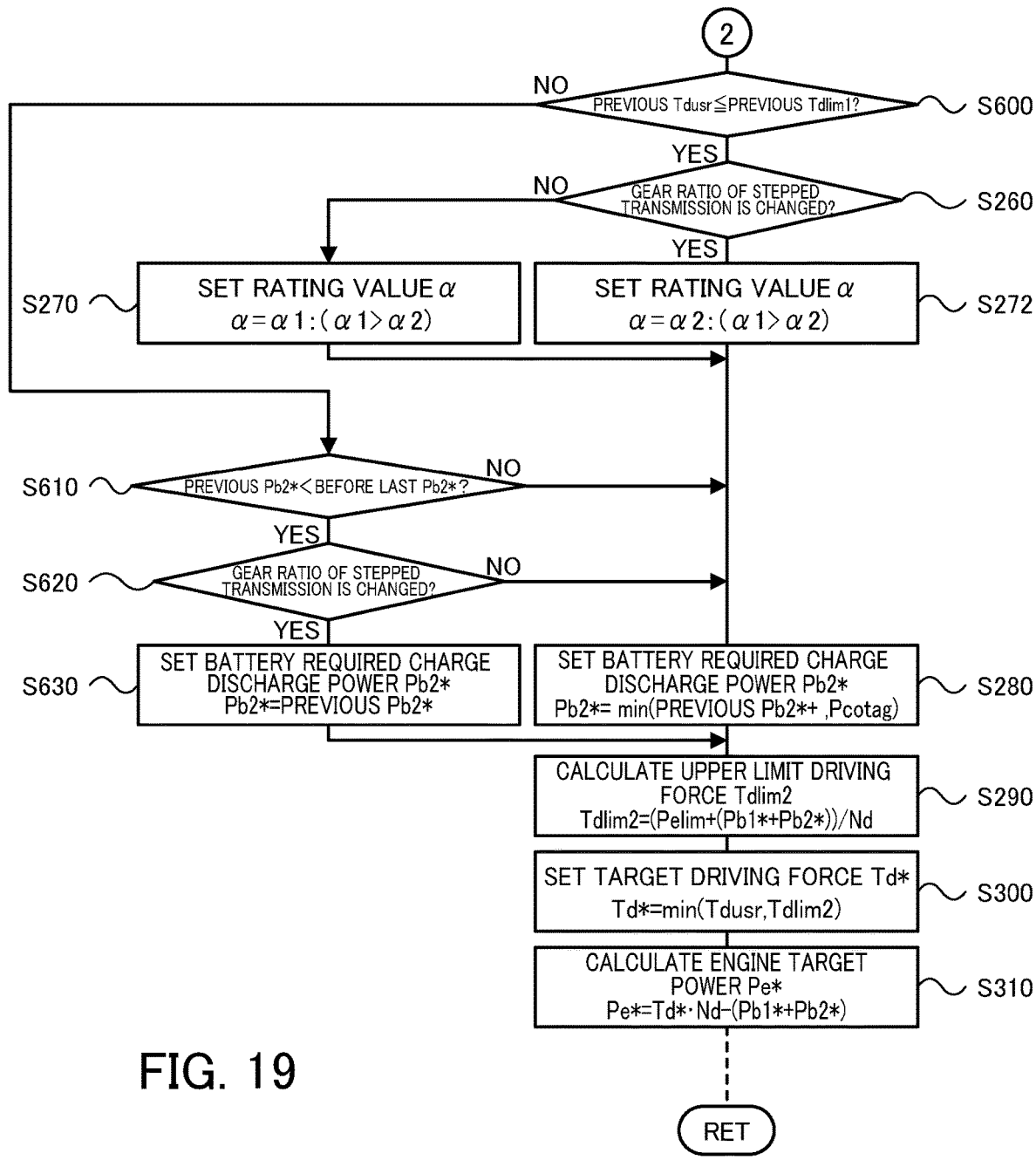
FIG. 19 is a flowchart showing one example of the drivability priority control routine (latter half) according to another modification.

In the hybrid vehicle 20 of the embodiment, the HVECU 70 performs the drivability priority control routine of FIG. 5 and FIG. 6. The HVECU 70 may, however, perform the drivability priority control routine (first half) of FIG. 5 and the drivability priority control routine (latter half) of FIG. 19. The drivability priority control routine of FIG. 19 is similar to the drivability priority control routine of FIG. 6, except addition of the processing of step S600 to S630. The description of the processing of the step S200 to S220 and S320 to S370 of the drivability priority control routine of FIG. 19 is accordingly omitted.

After setting of the target compensation power Pcotag of the battery 50 at step S250 and before the processing of step S260 of the drivability priority control routine of FIG. 5, in the drivability priority control routine of FIG. 19, the HVECU 70 compares the previous required driving force (previous Tdusr) with the previous first upper limit driving force (previous Tdlim1) (step S600). Such comparison is a process of determining whether it is a timing immediately after the required driving force Tdusr becomes larger than the upper limit driving force Tdlim1, i.e., whether it is a timing immediately after a start of the requirement for battery power compensation.

When the previous required driving force (previous Tdusr) is equal to or smaller than the previous first upper limit driving force (previous Tdlim1) at step S600, the HVECU 70 determines that it is the timing immediately after the start of the requirement for battery power compensation and performs the processing of and after step S260.

When the previous required driving force (previous Tdusr) is larger than the previous first upper limit driving force (previous Tdlim1) at step S600, the HVECU 70 determines that it is not the timing immediately after the start of the requirement for battery power compensation (this requirement is being continued), and compares the previous required charge discharge power (previous Pb2*) with the required charge discharge power before the last (before last Pb2*) (step S610). Such comparison is a process of determining whether the required charge discharge power Pb2* of the battery 50 is decreasing with a decrease of the target compensation power Pcotag after the required charge discharge power Pb2* of the battery 50 reached the target compensation power Pcotag.

When the previous required charge discharge power (previous Pb2*) is equal to or larger than the required charge discharge power before the last (before last Pb2*) at step S610, the HVECU 70 determines that the required charge discharge power Pb2* of the battery 50 is not decreasing and performs the processing of and after step S280.

When the previous required charge discharge power of the battery 50 (previous Pb2*) is smaller than the required charge discharge power before the last (before last Pb2*) at step S610, the HVECU 70 determines that the required charge discharge power Pb2* of the battery 50 is decreasing. The HVECU 70 further determines, like the processing of step S260, whether the gear ratio Gsat of the stepped transmission 60 is changed (shifted) (step S620). When the gear ratio Gsat of the stepped transmission 60 is not changed, the HVECU 70 performs the processing of and after step S280.

When the gear ratio Gsat of the stepped transmission 60 is changed (shifted) at step S620, the HVECU 70 sets a required charge discharge power Pb2* to the previous required charge discharge power (previous Pb2*) of the battery 50, that is, the required charge discharge power Pb2* of the battery 50 is kept unchanged (step S630), and performs the processing of and after step S290. This suppresses the required charge discharge power Pb2* and accordingly the torque command Tm2* of the motor MG2 (a torque output to the input shaft 61 of the stepped transmission 60 from the motor MG2) to be changed and also suppresses the driving force output to the drive shaft 36 to be changed when the gear ratio Gsat of the stepped transmission 60 is changed.

In the hybrid vehicle 20 of the embodiment, the HVECU 70 processes the target compensation power Pcotag of the battery 50 by the rating process using the rating value α to calculate the required charge discharge power Pb2* of the battery 50. According to a modification, the HVECU 70 may process the target compensation power Pcotag of the battery 50 by a smoothing process using a time constant τ to calculate the required charge discharge power Pb2* of the battery 50. In this case, when the gear ratio Gsat of the stepped transmission 60 is not changed, the HVECU 70 may set a relatively small predetermined value τ1 to the time constant T. When the gear ratio Gsat of the stepped transmission 60 is changed, the HVECU 70 may set a predetermined value τ2 that is larger than the predetermined value τ1 to the time constant T.

The hybrid vehicle 20 of the embodiment is provided with the mode switch 90. The HVECU 70 performs the drivability priority control routine of FIGS. 5 and 6 when the hybrid vehicle 20 is driven by HV drive at the shift position SP set to the D position with selection of the drivability priority mode as the working drive mode by the driver's operation of the mode switch 90. According to a modification, the hybrid vehicle 20 may not be provided with the mode switch 90. The HVECU 70 may perform the drivability priority control routine of FIGS. 5 and 6 when the hybrid vehicle 20 is driven by HV drive at the shift position SP set to the D position in the ordinary mode.

The hybrid vehicle 20 of the embodiment has the parking position (P position), the reverse position (R position), the neutral position (N position) and the drive position (D position) provided as the shift position SP. The shift position SP may further include a manual position (M position), in addition to these positions. The manual position (M position) is provided with an upshift position (+ position) and a downshift position (− position). When the shift position SP is set to the manual position (M position), the engine 22 is driven and controlled such as to be connected with the driveshaft 36 via the ten-speed simulated transmission.

Figure 20:
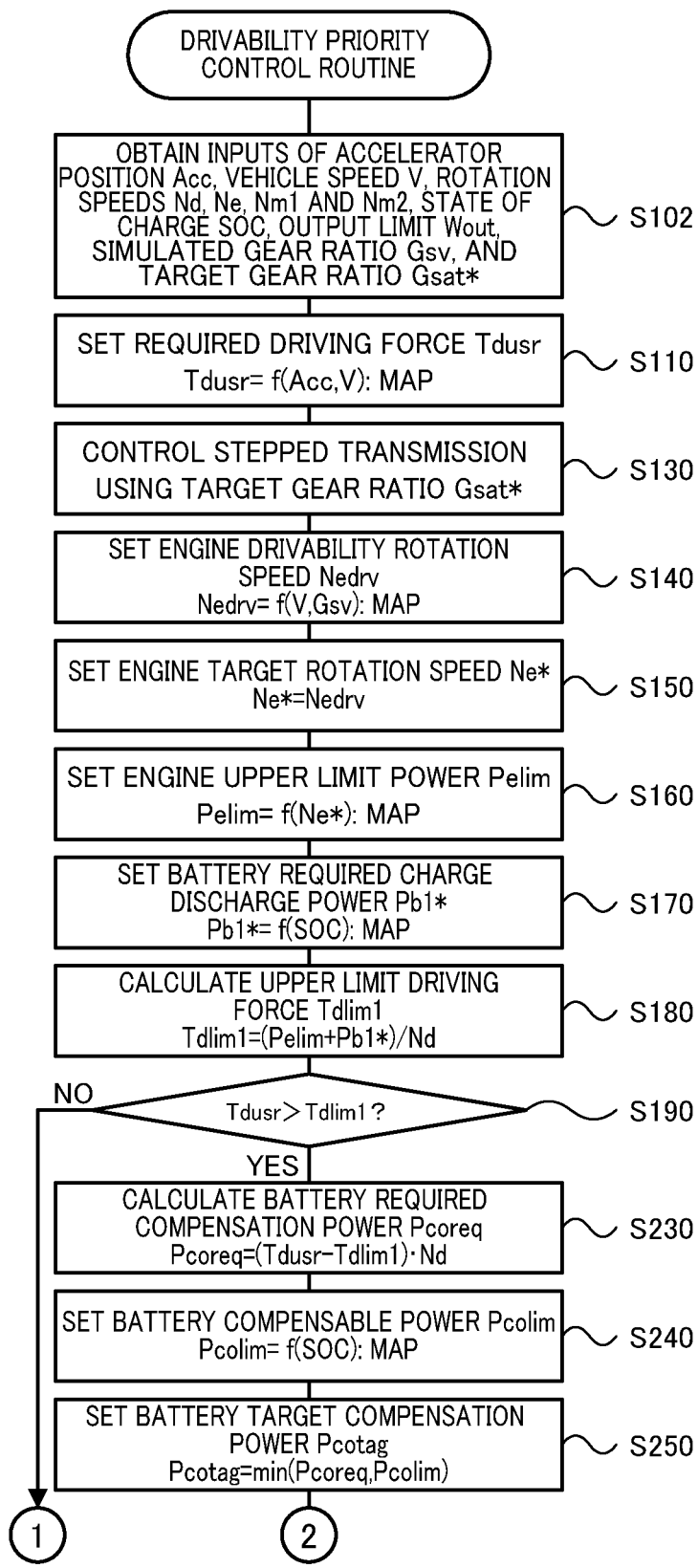
FIG. 20 is a flowchart showing one example of the drivability priority control routine (first half) according to another modification.

The following describes a series of operations when the shift position SP is set to the manual position (M position). In this case, the HVECU 70 may perform a drivability priority control routine (first half) of FIG. 20 and the drivability priority control routine (latter half) of FIG. 6, in place of the drivability priority control routines of FIGS. 5 and 6. The drivability priority control routine of FIG. 20 is similar to the drivability priority control routine of FIG. 5, except replacement of the processing of step S100 by the processing of S102 and omission of the processing of step S120. The following briefly describes drive control at the shift position SP set to the manual position (M position) with reference to the drivability priority control routine of FIG. 20.

In the drivability priority control routine of FIG. 20, the HVECU 70 first obtains input data of, for example, the simulated gear ratio Gsv and the target gear ratio Gsat*, in addition to the accelerator position Acc, the vehicle speed V, the rotation speed Nd of the driveshaft 36, the rotation speed Ne of the engine 22, the rotation speeds Nm1 and Nm2 of the motors MG1 and MG2 and the state of charge SOC and the output limit Wout of the battery 50 (step S102). The simulated gear ratio Gsv and the target gear ratio Gsat* input here are values detected based on the shift position SP.

After obtaining the input data, the HVECU 70 sets the required driving force Tdusr according to the required driving force setting map by using the accelerator position Acc and the vehicle speed V (step S110). The HVECU 70 subsequently controls the stepped transmission 60 by using the target gear ratio Gsat* (step S130) and performs the processing of and after step S140. As a result, the same effect as that of the embodiment can be obtained.

In the hybrid vehicle 20 of the embodiment, the ten-speed simulated transmission is configured such that two virtual gear ratios are provided with regard to each of the gear ratios of the first to the third speeds of the four-speed stepped transmission 60. The number of speeds of the stepped transmission 60 is, however, not limited to the four speeds but may be two speeds or three speeds or may be five or more speeds. According to a modification, a desired number of virtual gear ratios, for example, one gear ratio or two gear ratios may be provided with regard to at least one of the gear ratios of the respective speeds of the stepped transmission 60. In this modification, a different desired number of gear ratios may be provided with regard to each of the gear ratios of the respective speeds of the stepped transmission 60. A hybrid vehicle of another modification may not be provided with any virtual gear ratios.

In the hybrid vehicle 20 of the embodiment, the motor MG2 is directly connected with the input shaft 61 of the stepped transmission 60. According to a modification, the motor MG2 may be connected with the input shaft 61 of the stepped transmission 60 via a speed reducer or the like. According to another modification, the motor MG2 may be directly connected with the output shaft 62 of the stepped transmission 60. According to another modification, the motor MG2 may be connected with the output shaft 62 of the stepped transmission 60 via a speed reducer or the like.

The hybrid vehicle 20 of the embodiment uses the battery 50 as the power storage device. According to a modification, a capacitor may be used as the power storage device.

The hybrid vehicle 20 of the embodiment is provided with the engine ECU 24, the motor ECU 40, the battery ECU 52 and the HVECU 70. At least two of these ECUs may be configured as a single electronic control unit.

In the hybrid vehicle of the present disclosure, the control device may be programmed to reduce the working compensation power, in a case where the working compensation power has a positive value and where the operation amount of the accelerator becomes larger than a predetermined operation amount or the vehicle speed becomes higher than a predetermined vehicle speed.

In this case, the control device may be programmed to maintain the working compensation power, when the gear ratio of the stepped transmission is changed during reduction of the working compensation power in the case where the working compensation power has the positive value and where the operation amount of the accelerator becomes larger than the predetermined operation amount or the vehicle speed becomes higher than the predetermined vehicle speed. This hybrid vehicle can suppress the change of the working compensation power when the gear ratio of the stepped transmission is changed, and can suppress the change of the driving force of the drive shaft.

In the hybrid vehicle of the present disclosure, the control device may be programmed to maintain the working compensation power, when the gear ratio of the stepped transmission is changed during reduction of the working compensation power accompanied with a decrease in the target compensation power. This hybrid vehicle can suppress the change of the working compensation power when the gear ratio of the stepped transmission is changed, and can suppress the change of the driving force of the drive shaft.

In the hybrid vehicle of the present disclosure, when setting the first upper limit driving force, the control device may be programmed to set the first upper limit driving force to a driving force when a total power of the upper limit power and a first required charge discharge power of the power storage device, which is based on a state of charge of the power storage device and has a positive value on a discharge side, is output to the driveshaft, and when setting the second upper limit driving force, the control device may be programmed to set the second upper limit driving force to a driving force when a total power of the upper limit power, the first required charge discharge power, and a second required charge discharge power of the power storage device, which has a positive value on the discharge side and serves as the working compensation power, is output to the driveshaft.

In this case, when the required driving force is equal to or smaller than the first upper limit driving force, the control device may be programmed to set a target power of the engine to a power determined by subtracting the first required charge discharge power from a power that causes the target driving force to be output to the driveshaft, and when the required driving force is larger than the first upper limit driving force, the control device may be programmed to set the target power of the engine to a power determined by subtracting a sum of the first required charge discharge power and the second required charge discharge power from the power that causes the target driving force to be output to the driveshaft. The control device may be programmed to control the engine such that the target power is output from the engine.

The following describes the correspondence relationship between the primary elements of the above embodiment and the primary elements of the disclosure described in Summary. In the embodiment, the engine 22 corresponds to the "engine", the motor MG1 corresponds to the "first motor", the planetary gear 30 corresponds to the "planetary gear", and the motor MG2 corresponds to the "second motor", the battery 50 corresponds to the "power storage device" the engine ECU 24, the motor ECU 40 and the HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the hybrid vehicle and so on.

What is claimed is:

1. A hybrid vehicle, comprising an engine; a first motor; a planetary gear including three rotational elements that are respectively connected with the engine, the first motor and a transmission member; a stepped transmission placed between the transmission member and a driveshaft linked with an axle; a second motor configured to input and output power from and to the transmission member or the driveshaft; a power storage device configured to transmit electric power to and from the first motor and the second motor; and a control device, wherein
the control device is programmed to:
set a required driving force that is required for the driveshaft, based on an operation amount of an accelerator and a vehicle speed;
set a simulated gear ratio from a gear ratio of the stepped transmission or from the gear ratio of the stepped transmission by taking into account a virtual gear ratio and set a target gear ratio of the stepped transmission, based on the operation amount of the accelerator and the vehicle speed or based on a driver's shift operation;
set a target rotation speed of the engine, based on the vehicle speed and the simulated gear ratio;
set an upper limit power of the engine when the engine is operated at the target rotation speed;
set a first upper limit driving force of the driveshaft when the upper limit power is output from the engine;
set a target driving force of the driveshaft according to a magnitude relationship between the required driving force and the first upper limit driving force; and
control the engine, the first motor, the second motor and the stepped transmission, such that the engine is operated at the target rotation speed, the gear ratio of the stepped transmission becomes equal to the target gear ratio, and the hybrid vehicle is driven based on the target driving force, and wherein
when the required driving force is equal to or smaller than the first upper limit driving force,
the control device is programmed to set the target driving force to the required driving force, and
when the required driving force is larger than the first upper limit driving force,
the control device is programmed to set a target compensation power of the power storage device, based on a difference between the required driving force and the first upper limit driving force,
the control device is programmed to set a second upper limit driving force of the driveshaft when the upper limit power is output from the engine and the power storage device is charged or discharged according to a working compensation power based on the target compensation power, and
the control device is programmed to set the target driving force to the smaller between the required driving force and the second upper limit driving force, and wherein
the control device is programmed to gradually increase the working compensation power toward the target compensation power when the gear ratio of the stepped transmission is changed, compared with an increase in the working compensation power when the gear ratio of the stepped transmission is not changed.

2. The hybrid vehicle according to claim 1,
wherein the control device is programmed to reduce the working compensation power, in a case where the working compensation power has a positive value and where the operation amount of the accelerator becomes larger than a predetermined operation amount or the vehicle speed becomes higher than a predetermined vehicle speed.

3. The hybrid vehicle according to claim 2,
wherein the control device is programmed to maintain the working compensation power, when the gear ratio of the stepped transmission is changed during reduction of the working compensation power in the case where the working compensation power has the positive value and where the operation amount of the accelerator becomes larger than the predetermined operation amount or the vehicle speed becomes higher than the predetermined vehicle speed.

4. The hybrid vehicle according to claim 1,
wherein the control device is programmed to maintain the working compensation power, when the gear ratio of the stepped transmission is changed during reduction of the working compensation power accompanied with a decrease in the target compensation power.

5. The hybrid vehicle according to claim 1,
wherein when setting the first upper limit driving force, the control device is programmed to set the first upper limit driving force to a driving force when a total power of the upper limit power and a first required charge discharge power of the power storage device, which is based on a state of charge of the power storage device and has a positive value on a discharge side, is output to the driveshaft, and when setting the second upper limit driving force, the control device is programmed to set the second upper limit driving force to a driving force when a total power of the upper limit power, the first required charge discharge power, and a second required charge discharge power of the power storage device, which has a positive value on the discharge side and serves as the working compensation power, is output to the driveshaft.

6. The hybrid vehicle according to claim 5,
wherein when the required driving force is equal to or smaller than the first upper limit driving force, the control device is programmed to set a target power of the engine to a power determined by subtracting the first required charge discharge power from a power that causes the target driving force to be output to the driveshaft, and when the required driving force is larger than the first upper limit driving force, the control device is programmed to set the target power of the engine to a power determined by subtracting a sum of the first required charge discharge power and the second required charge discharge power from the power that causes the target driving force to be output to the driveshaft, and wherein the control device is programmed to control the engine such that the target power is output from the engine.

* * * * *